United States Patent
Kaneko

(10) Patent No.: US 9,288,339 B2
(45) Date of Patent: Mar. 15, 2016

(54) DATA GENERATION APPARATUS, DATA GENERATION METHOD, AND COMPUTER-READABLE MEDIUM FOR ASSIGNING A THUMB INDEX FOR PAGES OF A BOOK

(75) Inventor: Takayuki Kaneko, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1155 days.

(21) Appl. No.: 13/297,832

(22) Filed: Nov. 16, 2011

(65) Prior Publication Data

US 2012/0151332 A1     Jun. 14, 2012

(30) Foreign Application Priority Data

Dec. 8, 2010    (JP) ................. 2010-273938
Oct. 28, 2011    (JP) ................. 2011-237968

(51) Int. Cl.
    *H04N 1/00*       (2006.01)
    *G06F 3/12*        (2006.01)
    *H04N 1/387*      (2006.01)

(52) U.S. Cl.
    CPC .......... *H04N 1/00196* (2013.01); *G06F 3/1208* (2013.01); *G06F 3/1252* (2013.01); *G06F 3/1285* (2013.01); *H04N 1/3875* (2013.01); *G06F 3/1242* (2013.01)

(58) Field of Classification Search
    CPC ..... G06F 17/24; G06F 3/1252; G06F 3/1285; G06F 3/1208; G06F 3/1242; B42F 21/12; H04N 1/00196; H04N 1/3875
See application file for complete search history.

(56) References Cited

U.S. PATENT DOCUMENTS

| | | | | |
|---|---|---|---|---|
| 6,134,568 A | * | 10/2000 | Tonkin | 715/209 |
| 6,178,431 B1 | * | 1/2001 | Douglas | 715/205 |
| 6,507,410 B1 | * | 1/2003 | Robertson et al. | 358/1.18 |
| 6,571,054 B1 | | 5/2003 | Tonomura et al. | |
| 6,809,741 B1 | * | 10/2004 | Bates et al. | 345/597 |
| 6,915,273 B1 | * | 7/2005 | Parulski | 705/26.5 |
| 6,953,513 B1 | * | 10/2005 | Volkert | 156/256 |
| 7,047,490 B1 | * | 5/2006 | Markovic et al. | 715/234 |
| 7,574,649 B1 | * | 8/2009 | Safars et al. | 715/200 |
| 7,813,546 B2 | * | 10/2010 | Yamazaki | 382/167 |
| 2002/0131075 A1 | * | 9/2002 | Kremer | 358/1.15 |
| 2004/0179231 A1 | * | 9/2004 | Savino | G06T 11/60 358/1.15 |
| 2004/0194033 A1 | * | 9/2004 | Holzwarth | G06F 17/211 715/274 |
| 2005/0015392 A1 | * | 1/2005 | Tonkin | 707/100 |
| 2005/0172225 A1 | * | 8/2005 | Kobashi et al. | 715/517 |
| 2012/0027303 A1 | * | 2/2012 | Cok | 382/190 |
| 2013/0021645 A1 | * | 1/2013 | Lee | G06F 3/1208 358/1.15 |

FOREIGN PATENT DOCUMENTS

| | | |
|---|---|---|
| JP | 2001-005838 A | 1/2001 |
| JP | 2002-008049 A | 1/2002 |

* cited by examiner

*Primary Examiner* — Cesar Paula
*Assistant Examiner* — Tyler J Schallhorn
(74) *Attorney, Agent, or Firm* — Fitzpatrick, Cella, Harper & Scinto

(57) ABSTRACT

A data generation apparatus for generating data to be used to for bookbinding by bundling a plurality of paper sheets into a book form, comprises: a determination unit configured to determine based on a criterion defined in advance for a characteristic of the book whether to assign a thumb index for each page of the book; and a generation unit configured to generate, for a page to which the determination unit has determined to assign the thumb index, data that arranges the thumb index to be printed at a fore edge of the page of the book.

12 Claims, 19 Drawing Sheets

| DETERMINATION TYPE | THUMB INDEX ASSIGNMENT CONDITION | |
|---|---|---|
| NUMBER OF PAGES & NUMBER OF CLASSIFICATIONS | 15 TO 30 PAGES, NUMBER OF CLASSIFICATIONS IS 6 OR LESS | ~901 |
| | 31 TO 60 PAGES, NUMBER OF CLASSIFICATIONS IS 15 OR LESS | ~902 |
| | 61 TO 400 PAGES, NUMBER OF CLASSIFICATIONS IS 20 OR LESS | ~903 |

900

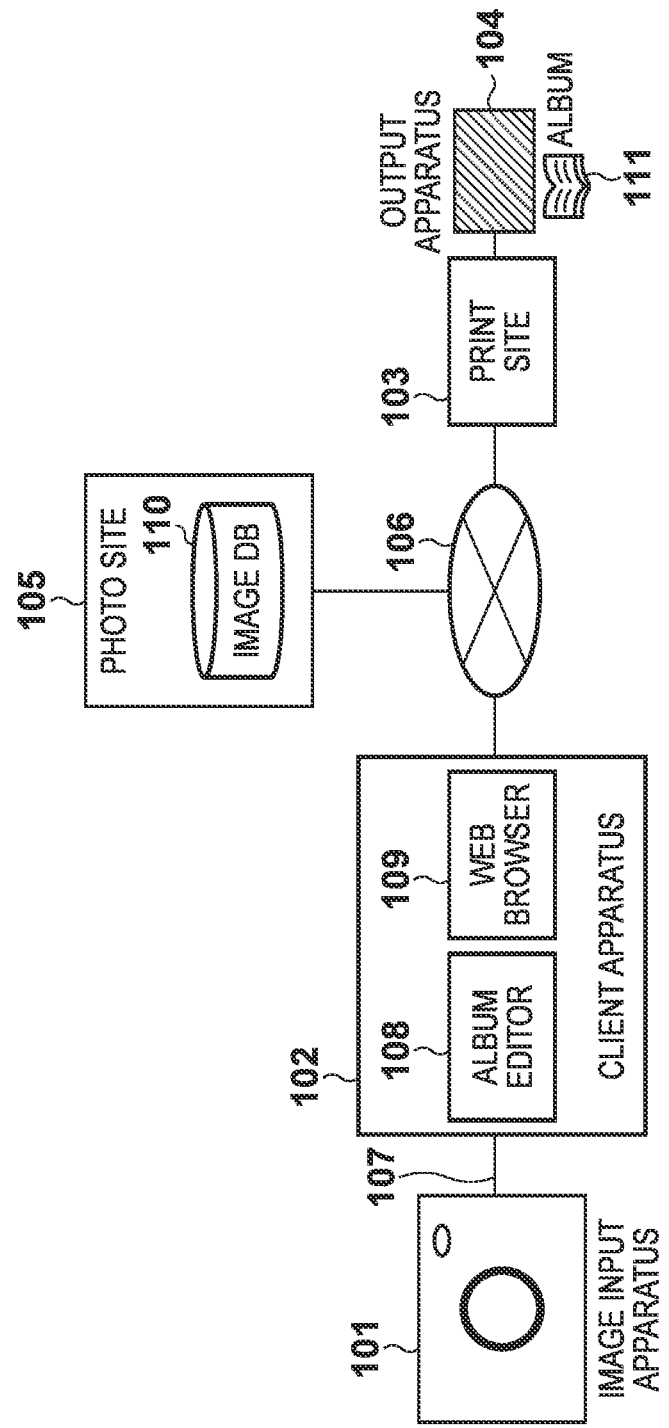

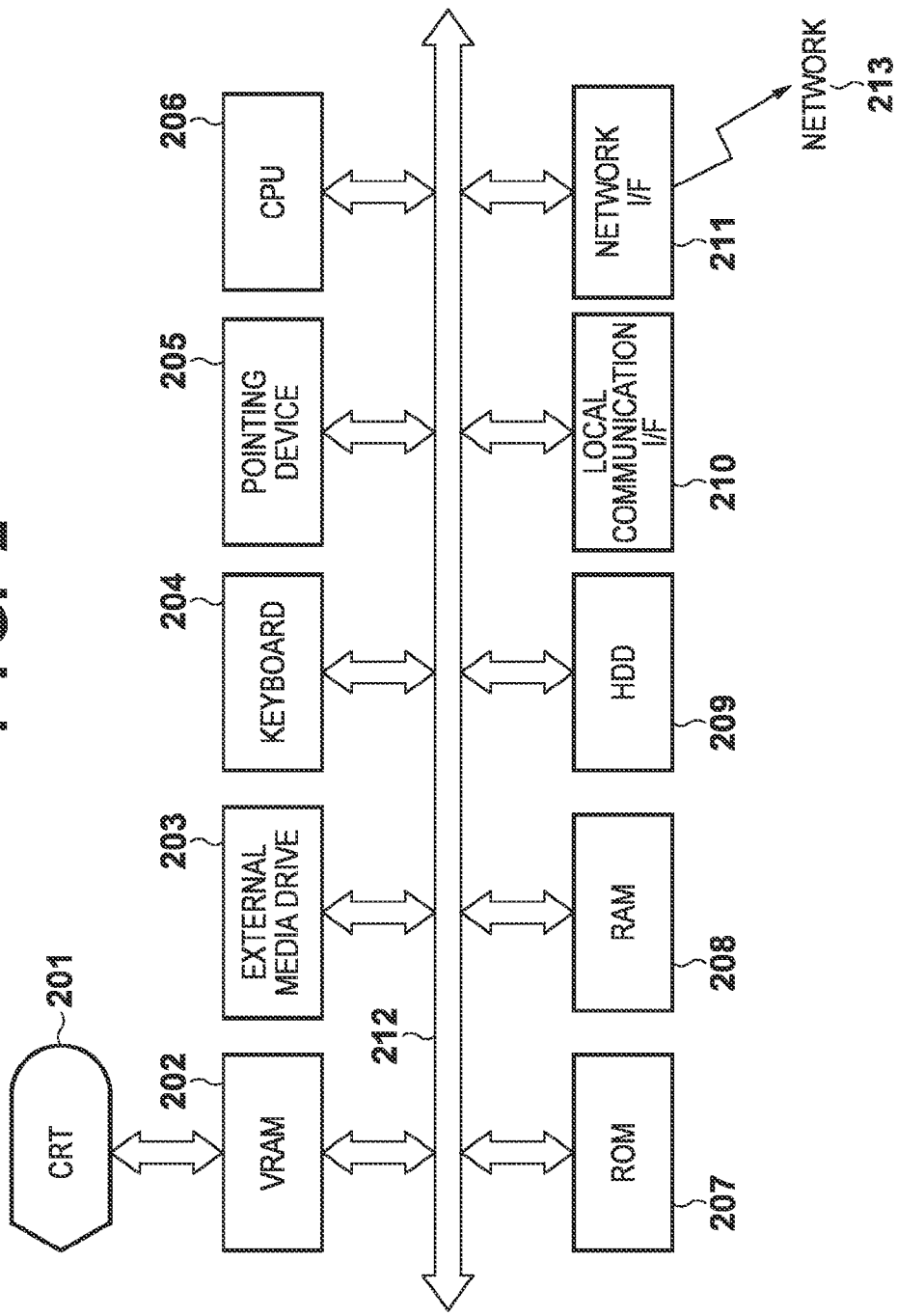

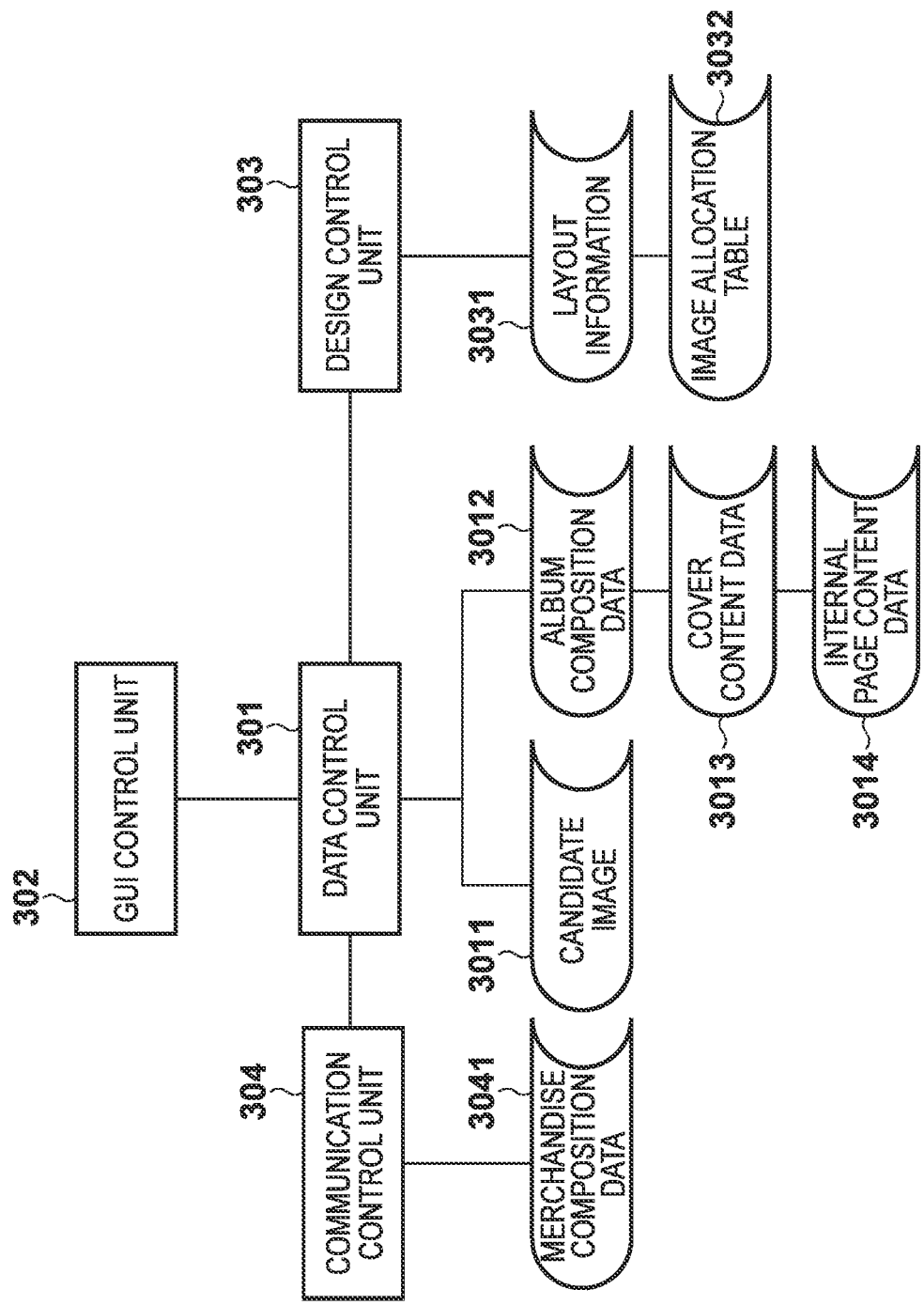

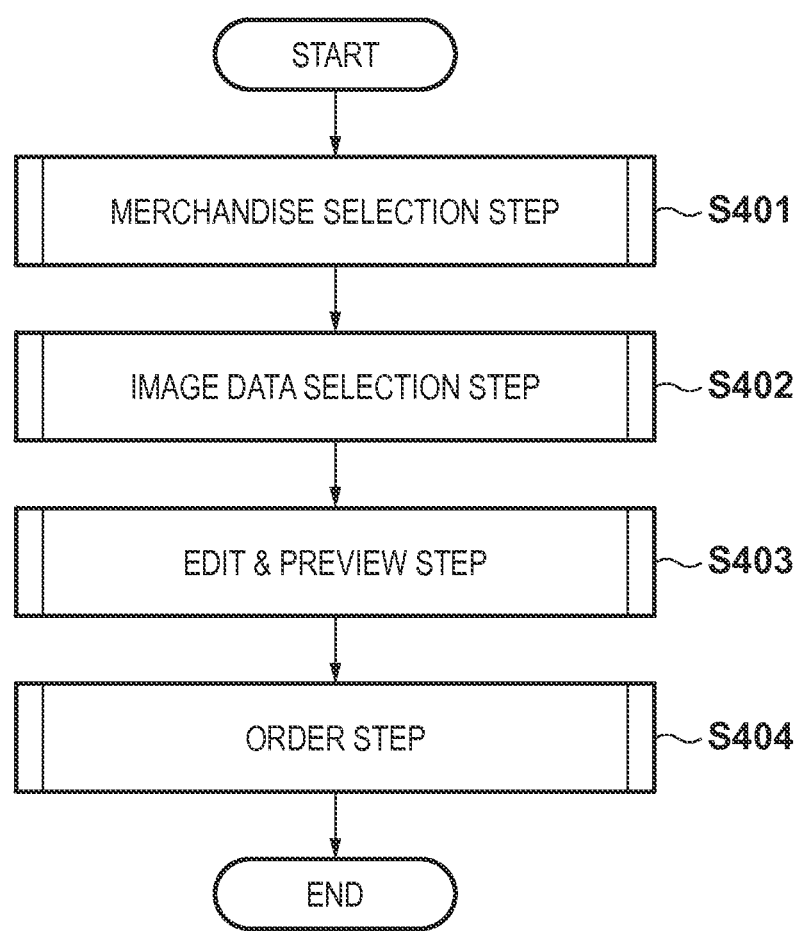

F I G. 5F
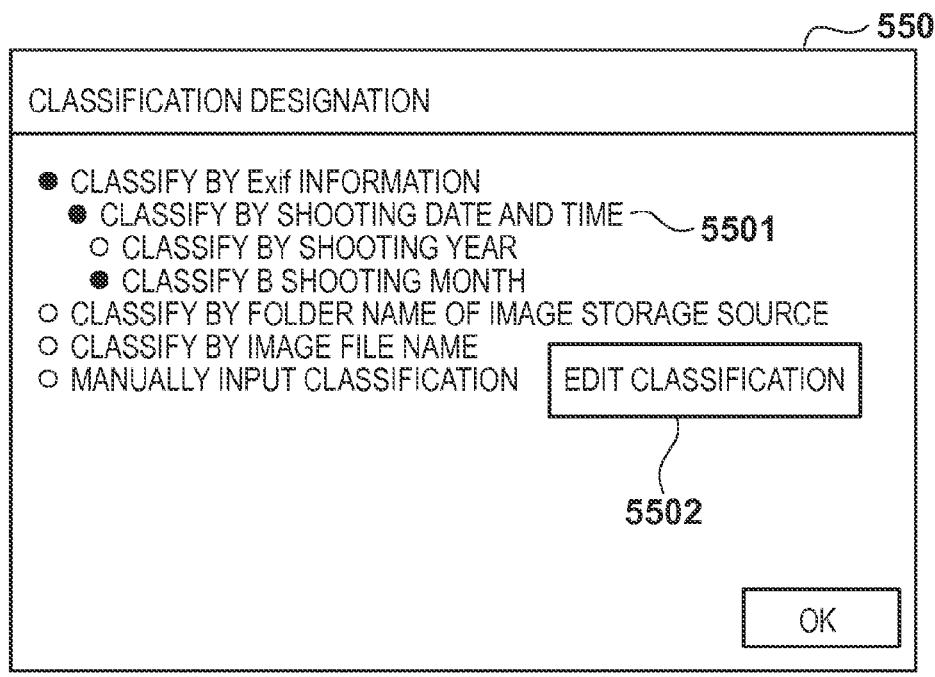
F I G. 5G
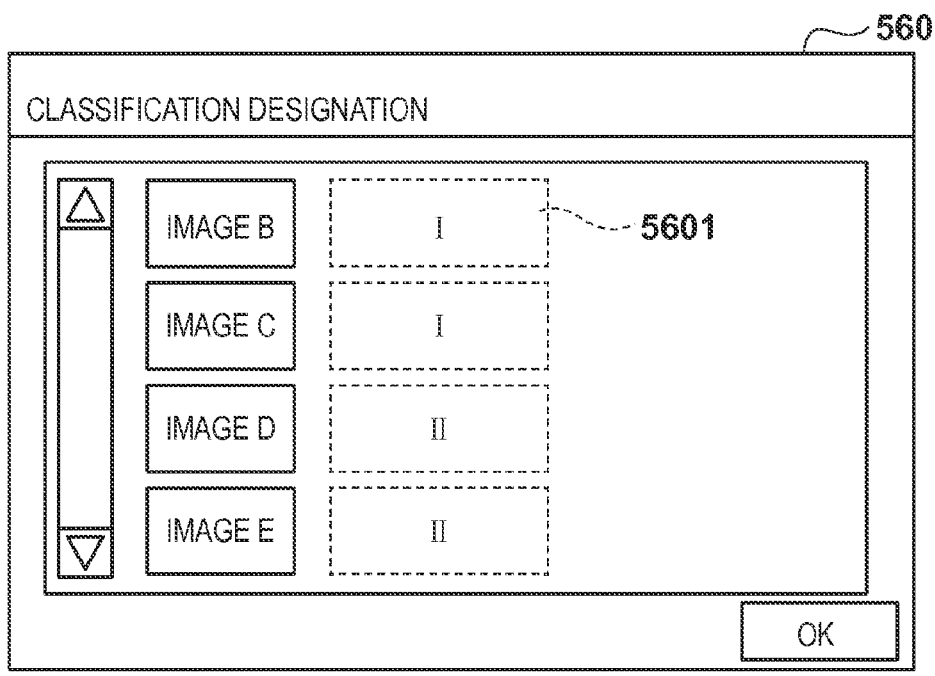

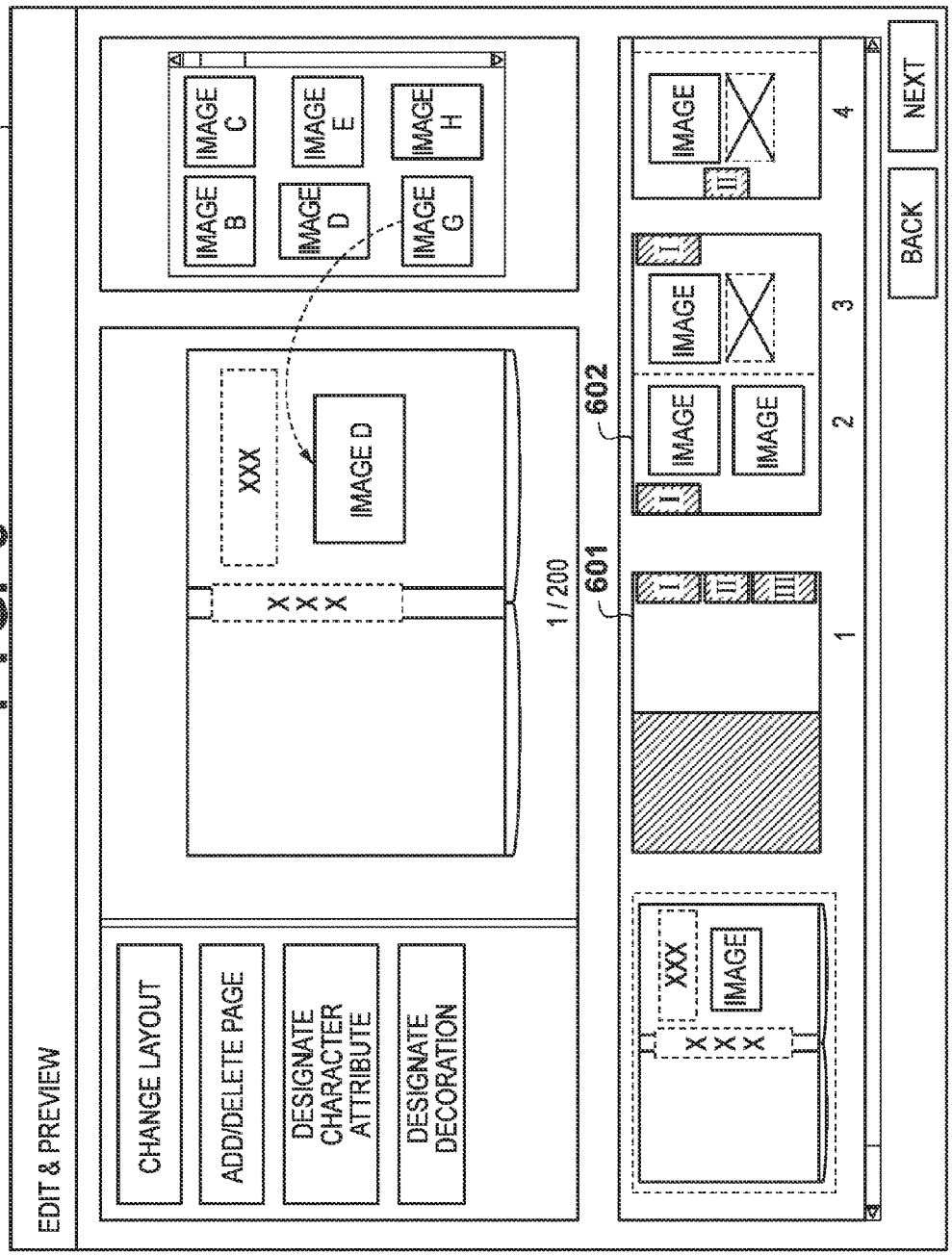

FIG. 7A

| DETERMINATION TYPE | THUMB INDEX ASSIGNMENT CONDITION |
|---|---|
| NUMBER OF PAGES | 15 PAGES OR MORE |

FIG. 7B

| DETERMINATION TYPE | THUMB INDEX ASSIGNMENT CONDITION |
|---|---|
| NUMBER OF PAGES & NUMBER OF CLASSIFICATIONS | 15 TO 30 PAGES, NUMBER OF CLASSIFICATIONS IS 6 OR LESS |
| | 31 TO 60 PAGES, NUMBER OF CLASSIFICATIONS IS 15 OR LESS |
| | 61 TO 400 PAGES, NUMBER OF CLASSIFICATIONS IS 20 OR LESS |

FIG. 7C

| DETERMINATION TYPE | THUMB INDEX ASSIGNMENT CONDITION |
|---|---|
| GRAMMAGE | 60 g/m² OR LESS |

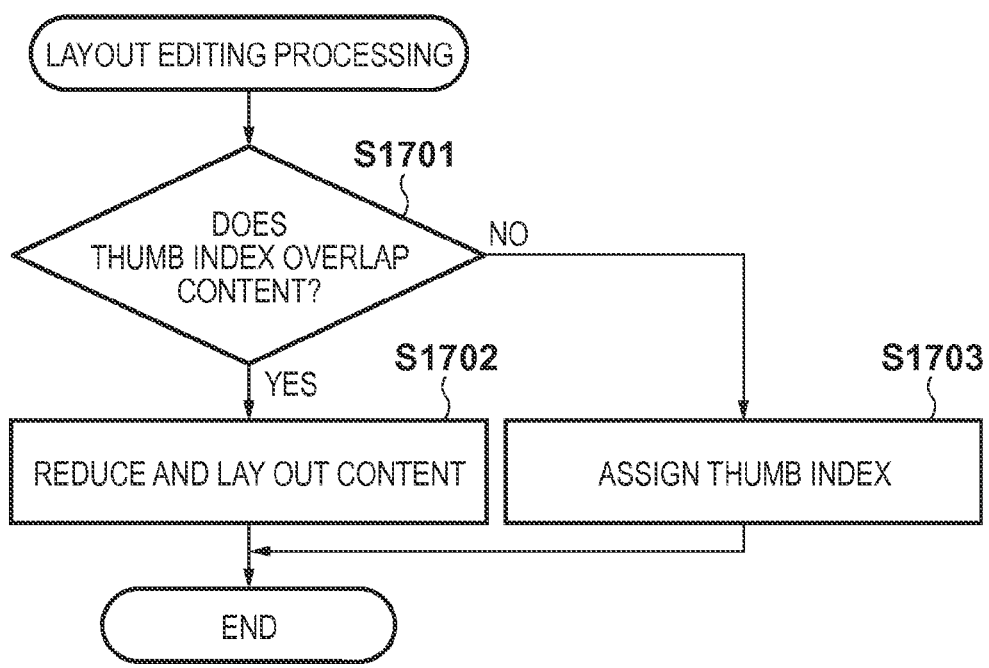
F I G. 15

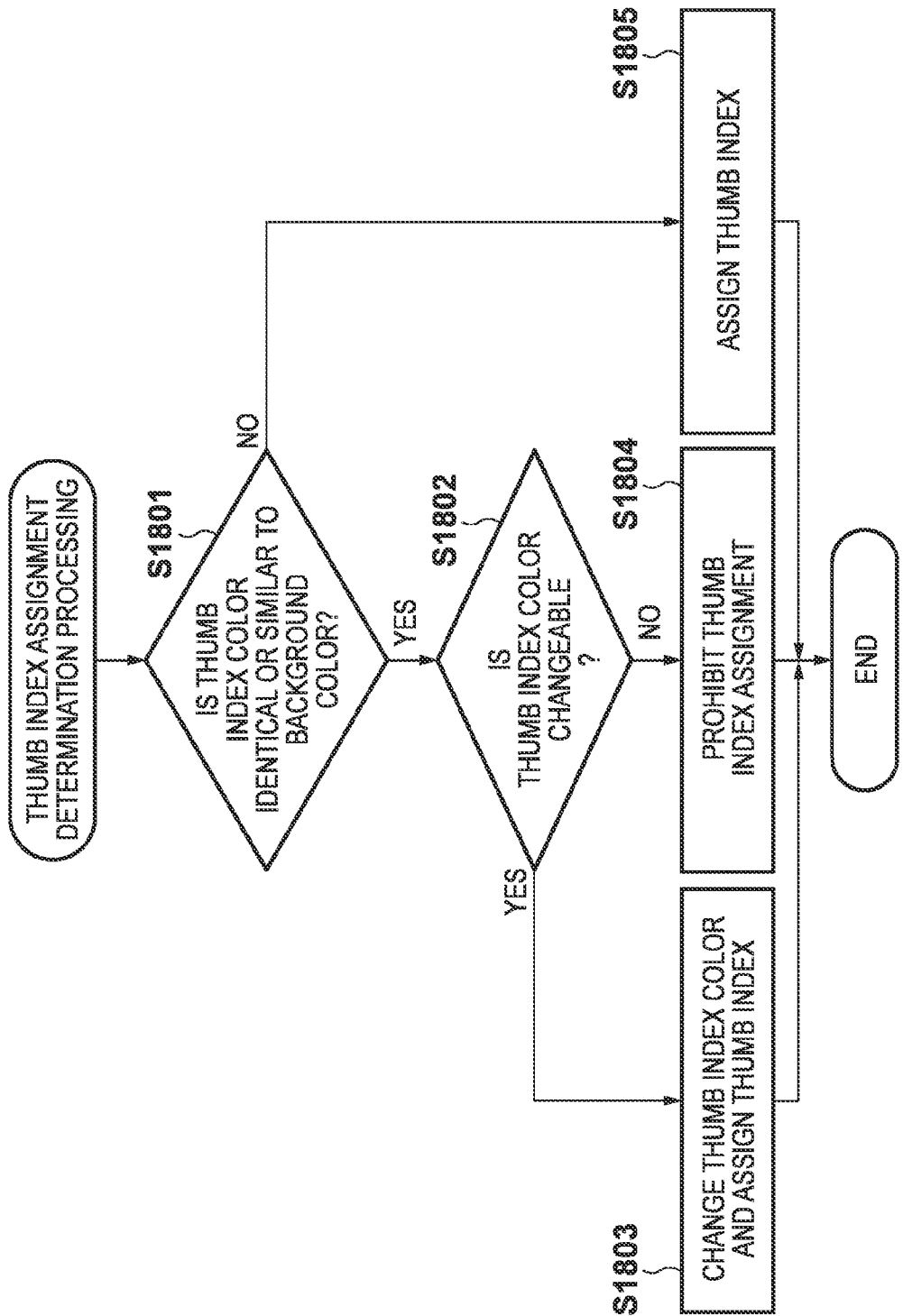

DATA GENERATION APPARATUS, DATA GENERATION METHOD, AND COMPUTER-READABLE MEDIUM FOR ASSIGNING A THUMB INDEX FOR PAGES OF A BOOK

BACKGROUND OF THE INVENTION

1. Field of the Invention

The present invention relates to a data generation apparatus, a data generation method, and a computer-readable medium in a book generation system that performs bookbinding by bundling a plurality of paper sheets.

2. Description of the Related Art

There is conventionally a system that performs bookbinding by bundling a plurality of paper sheets into a book form and stapling one of the four sides of the book. The book thus generated may include various contents. Hence, a demand has arisen for classifying and laying out the contents in the book or easily visually inspecting classification of the contents included in the book. One of related arts discloses giving additional information to each of a plurality of contents and inserting page breaks by determining the degree of change of details of each content based on the additional information (Japanese Patent Laid-Open No. 2001-5838). There also exists a technique of assigning a thumb index to the fore edge of an output paper sheet in accordance with classification of the content in the page (Japanese Patent Laid-Open No. 2002-8049).

In the above-described technical literatures, pages are partitioned based on content classification, or content classification in a book can be visualized by assigning a thumb index to each page. However, the thumb indices are always assigned even if the effect is small or absent from the viewpoint of visualization because the content composition of the book is not taken into consideration. For example, when determining content classification in a book by thumb indices, the effect is small if the book includes few pages. If the number of classifications is large, thumb index assignment may be redundant. When the grammage of paper sheets is large, the classification cannot be identified from the fore edge side even if thumb indices are assigned. The above-described technical literatures do not deal with these problems.

SUMMARY OF THE INVENTION

According to one aspect of the present invention, there is provided a data generation apparatus for generating data to be used to for bookbinding by bundling a plurality of paper sheets into a book form, comprising: a determination unit configured to determine based on a criterion defined in advance for a characteristic of the book whether to assign a thumb index for each page of the book; and a generation unit configured to generate, for a page to which the determination unit has determined to assign the thumb index, data that arranges the thumb index to be printed at a fore edge of the page of the book.

It is possible to improve the flexibility and convenience in visualizing classification in a book by determining thumb index assignment based on a predetermined determination criterion for each page of the book.

Further features of the present invention will become apparent from the following description of exemplary embodiments (with reference to the attached drawings).

BRIEF DESCRIPTION OF THE DRAWINGS

FIG. 1 is a block diagram showing the overall system configuration of a book generation apparatus according to the first embodiment;

FIG. 2 is a block diagram showing the hardware configuration of a client apparatus according to the first embodiment;

FIG. 3 is a block diagram showing the functional arrangement of an album editor;

FIG. 4 is a flowchart illustrating the outline of processing of the album editor;

FIGS. 5A, 5B, 5C, 5D, 5E, 5F, and 5G are views showing examples of a user interface;

FIG. 6 is a view showing an example of the user interface in the edit & preview step;

FIGS. 7A, 7B, and 7C are views showing examples of thumb index assignment conditions;

FIG. 15 is a flowchart of layout change processing according to the third embodiment; and FIG. 16 is a flowchart of layout change processing according to the fourth embodiment.

DESCRIPTION OF THE EMBODIMENTS

Figure 5A:
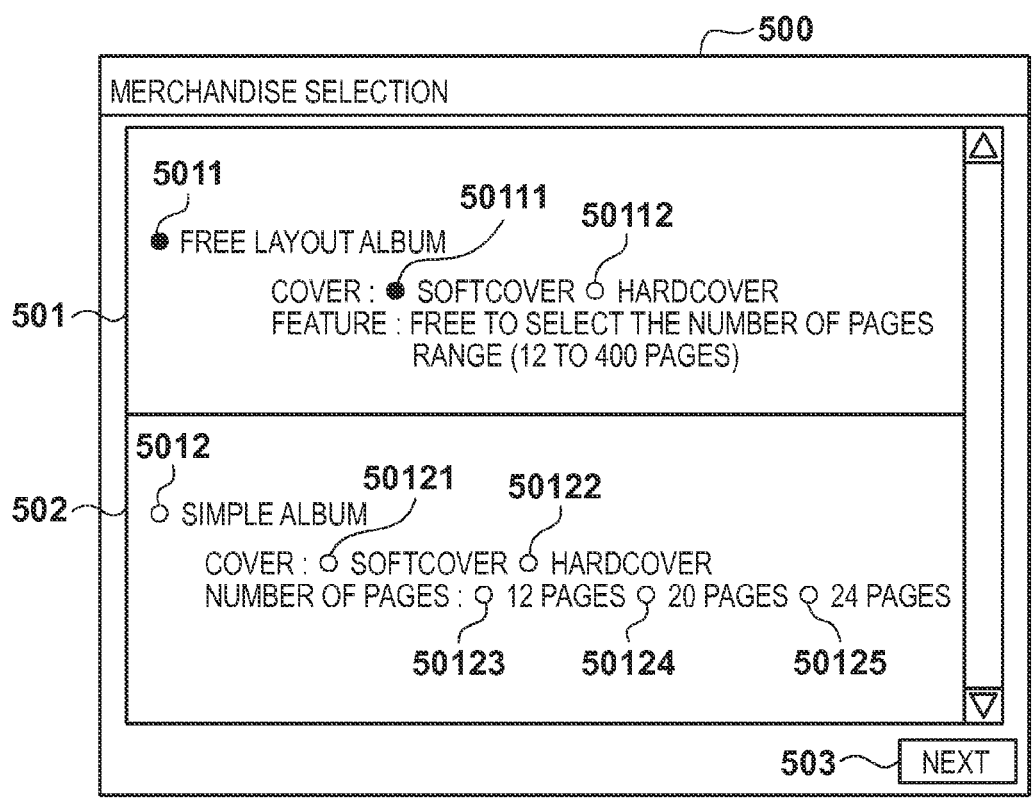
Figure 5B:
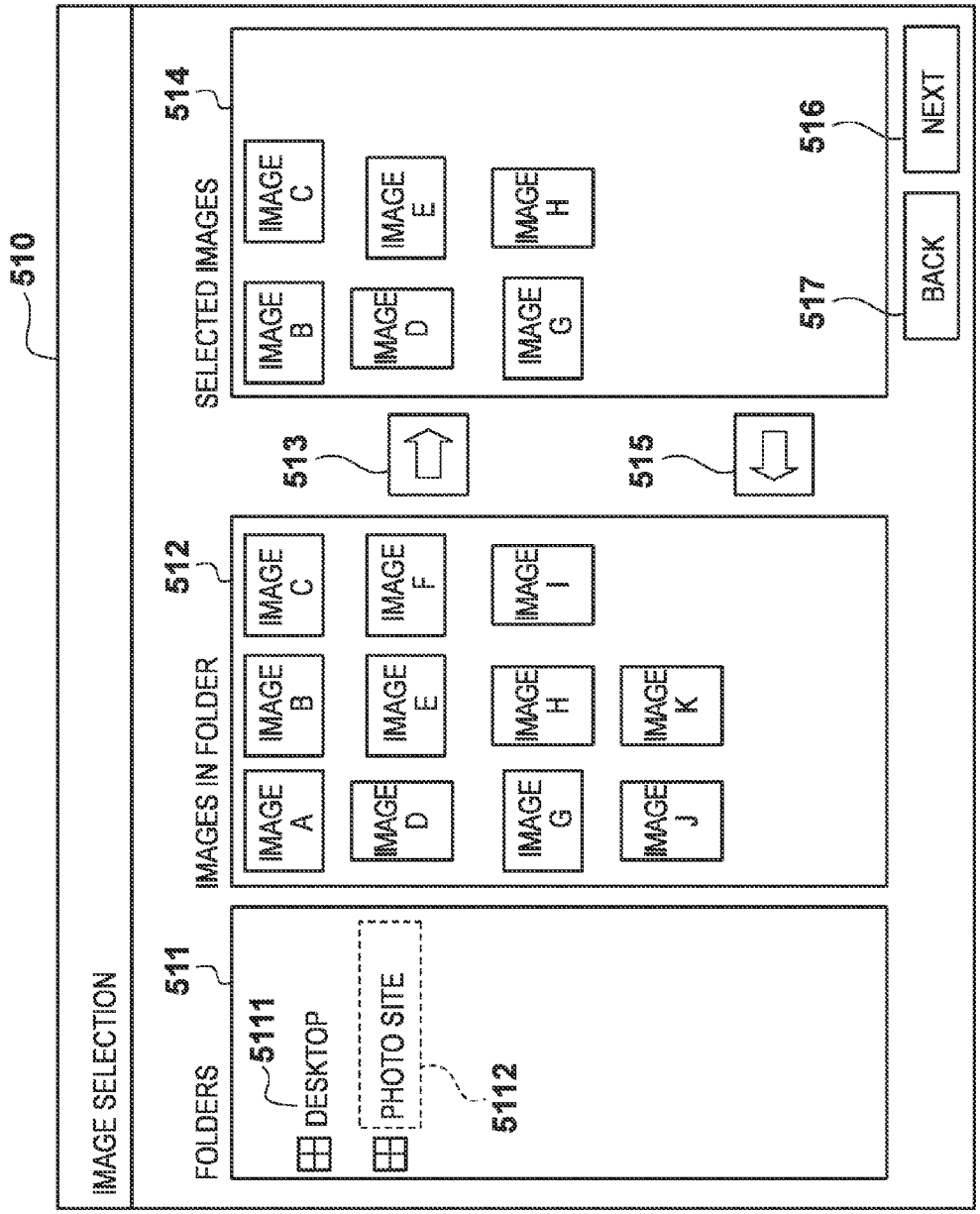

A mode for carrying out the present invention will now be described with reference to the accompanying drawings. First, characteristic terms used in this specification will be defined below.

[Book, Album]

A printed product generated by bundling a plurality of paper sheets into a book form. Also included is a photo album generated by printing, on sheets, digital images generated by a digital still camera, a digital video camera, a scanner, or the like.

[Contents]

Digital images or image data to be printed on each sheet (paper sheet) in a book.

[Thumb Index]

Classification information printed to the fore edge of a printed product. The thumb indices are widely used to print headwords in, for example, a dictionary. When the printed product is viewed from the fore edge side, the thumb indices combine to form an identifiable strip. The strips of thumb indices allow content classification to be visualized in a printed product.

[Output Apparatus]

An apparatus for printing electronic data on a paper sheet, which is synonymous with an image output apparatus, an image processing apparatus, an image forming apparatus, a printing apparatus, or the like. The output apparatus may be an MFP (MultiFunction Peripheral) having a plurality of functions to be described below. A printer function of printing print data in PDL (Page Description Language) or the like sent from a processing apparatus. A copy function of printing image data read by an image reading apparatus (scanner). A sending function for sending image data read by an image reading apparatus (scanner) to another information processing apparatus by fax or e-mail. A document storage function of storing, in an auxiliary storage device, print data in PDL or the like sent from an information processing apparatus. A fax-received document print function for printing data received by fax or the like. The apparatus may be equipped with any other arbitrary function. In this specification, post-processing apparatuses such as a case binding machine, a stapler, and a puncher are also handled as the output apparatus.

[Personal Computer]

A form of an electronic calculator or an information processing apparatus. A so-called personal computer currently wide-spread in an office or home. Also included are a workstation and a word processor.

[Exif]

An integrated standard of the image storage format widely used in digital cameras. This format can add shooting date and time, camera model, shooting conditions, and the like to an image file and also hold a thumbnail image. Maker's unique information, image title, and the like can also be managed.

[Grammage]

The standard weight of paper or paper board per unit area, that is, 1 m².

<System Configuration of Book Generation Apparatus>

FIG. 1 is a block diagram showing the system configuration of a book generation apparatus according to an embodiment of the present invention. The system configuration of the book generation apparatus will be described below with reference to FIG. 1. An image input apparatus 101 converts an optical image that is image information into an electrical signal, performs predetermined image processing, and records or reproduces the digital information. Examples of the image input apparatus 101 are a digital still camera, a digital video camera, and a scanner. A client apparatus 102 formed from a personal computer to be operated by the user includes an album editor 108 and applications such as a Web browser 109. The client apparatus 102 also serves as a data generation apparatus. A print site 103 is connected to the client apparatus 102 via a network 106. The user can give a print order of album data generated using the album editor 108 on the client apparatus 102 to the print site 103 using the Web browser 109.

An output apparatus 104 actually prints the album data sent to the print site 103 and generates an album 111. A photo site 105 stores and manages various kinds of Web page information and multimedia information such as images and audios in an image database (DB) 110. The network 106 is, for example, the Internet to which the client apparatus 102, the print site 103, and the photo site 105 are connected to send/receive various kinds of data. A local communication medium 107 is a communication medium configured to transfer image data acquired by the image input apparatus 101 to the client apparatus 102. Examples of the local communication medium 107 are a wired communication medium represented by USB (Universal Serial Bus) and IEEE1394 and a wireless communication medium represented by Bluetooth®. Image data transferred from the image input apparatus 101 to the client apparatus 102 via the local communication medium 107 is stored in a hard disk drive (HDD: not shown) in the client apparatus 102.

The album editor 108 serving as the data generation apparatus can run on the client apparatus 102 and electronically edit, based on user instructions, an album having a plurality of pages where image data and comments can be arranged. The Web browser 109 runs on the client apparatus 102. Using the Web browser 109, the user can access the photo site 105 via the network 106 and download template data or image data to be used to generate an album 111. The image DB 110 on the photo site 105 stores template data and image data to be downloaded by the Web browser 109 for an electronic album. The album 111 generated by the output apparatus 104 is the final product of this system.

Image data to be used by the album editor 108 for editing are roughly classified into two types. The first is image data registered in a storage medium such as the HDD on the client apparatus 102. The image data stored in the HDD include those acquired from the image input apparatus 101 and transferred to the client apparatus 102 via the local communication medium 107. The second is image data stored in the image DB 110 of the photo site 105. The image data generally include those uploaded from the client apparatus 102 to the photo site 105 via the network 106. When editing the album, the image data are downloaded from the photo site 105 to the client apparatus 102 via the network 106, as needed.

The client apparatus 102 can also give the print order of the edited album to the print site 103 via the photo site 105 instead of using the order method described concerning the print site 103. The print site 103 executes print processing for the album print order using the output apparatus 104, thereby outputting the album 111. Note that although FIG. 1 illustrates only one print site 103 and one photo site, two or more sites may be provided. The album editor 108 may be arranged in the photo site 105. In this case, the Web browser 109 on the client apparatus 102 communicates with the album editor 108 arranged in the photo site 105, thereby using the functions provided by the album editor 108.

<Hardware Configuration of Client Apparatus>

FIG. 2 is a block diagram showing the hardware configuration of the client apparatus 102. Referring to FIG. 2, for example, documents, graphics, and images under editing and other editing information, and user interface information such as a window, an icon, a message, and a menu are displayed on the display screen of a display device (for example, CRT) 201. An image to be displayed on the CRT 201 is rasterized on a VRAM 202. The image data generated on the VRAM 202 is transferred to the CRT 201 in accordance with a predetermined protocol so as to display the image on the CRT 201. An external media drive 203 performs a recording/reproduction operation for storage media represented by a CD or a DVD. The external media drive 203 also performs control when transferring data and various kinds of control programs including applications between the client apparatus 102 and the storage medium.

A keyboard 204 includes various kinds of keys to input characters and perform various operations. A pointing device 205 is used to, for example, point at and manipulate an icon, a menu, or another object displayed on the display screen of the CRT 201. A CPU 206 controls devices connected to it based on the control programs including applications stored in a ROM 207, a storage device (HDD) 209, and the external media drive 203. The ROM 207 holds various kinds of control programs and data. A RAM 208 includes the work area of the CPU 206, a data saving area at the time of error processing, a control program load area, and the like.

The HDD 209 is a storage device which stores various kinds of data and various kinds of control programs including the operating system (OS) and applications. A local communication interface (local communication I/F) 210 performs control when sending/receiving data to/from an external device such as the image input apparatus via the local communication medium 107. A network interface (network I/F) 211 is used to communicate with another information processing apparatus, a printer, or the like via a network 213. A CPU bus 212 includes an address bus, a data bus, and a control bus. Note that providing control programs to the CPU 206 can also be done from the ROM 207, the HDD 209, the local communication I/F 210, and the external media drive 203. This operation is also possible from another information processing apparatus via the network 213.

The album editor 108 of this embodiment is implemented as an application and stored in the HDD 209 as data executable by the OS. The OS maps the executable data of the album editor 108 on the RAM 208 and executes it using the CPU 206 based on user operations input via the pointing device 205 and the keyboard 204. The album editor 108 provides the user interface to the VRAM 202 by calling the API function provided by the OS. Upon receiving a user operation input to the user interface via the pointing device 205 or the keyboard 204, the OS notifies the album editor 108 of the event. The album editor 108 interprets the event and executes corresponding processing.

<Block Diagram of Album Editor>

FIG. 3 is a block diagram showing the functional arrangement of the album editor 108 according to this embodiment. A data control unit 301 manages and controls image data and raster data to generate an album 111 that is the final product. The data control unit 301 manages a candidate image 3011, album composition data 3012, cover content data 3013, and internal page content data 3014. A GUI control unit 302 provides an operation unit or an edit content display unit to the user by controlling the GUI for album generation.

A design control unit 303 manages and controls design information (for example, layout template data) to be used in an album. The design control unit 303 also manages layout information 3031 and an image allocation table 3032. A communication control unit 304 generates print data necessary for a print order based on the generated album information and communicates and manages the print data and information necessary for order processing. The communication control unit 304 manages merchandise composition data 3041.

The candidate image 3011 includes a group of images selected by the user as candidates to be stored in the album in the image selection step of album generation. The selected images are allocated to each page of the album in the edit & preview step of album generation, thereby generating an album.

The album composition data 3012 is information that holds basic composition information of the album under generation. The album composition data 3012 holds an album material setting, the composition page count, the link to the cover content data 3013, and the link to the internal page content data 3014. The cover content data 3013 holds image data to be allocated to the cover, the back cover, and the spine of the album which are managed by the data control unit 301, their rendering positions, the album title, and data about additional rendering for the mount. The internal page content data 3014 holds image data to be allocated to the pages that form the internal structure except the cover and the back cover of the album and their rendering positions, comments to the photos, and data about additional rendering for the mount portion. Content classification information is also held in the internal page content data 3014. "Classification information" is used to classify the internal contents by their details.

The album composition data 3012, the cover content data 3013, and the internal page content data 3014 included in the information of the album 111 under generation are generated in the edit & preview step of album generation. Note that the album composition data 3012, the cover content data 3013, and the internal page content data 3014 will also be referred to together as album data hereinafter.

The layout information 3031 records information to be used to determine images and character strings in each double truck page in the layout file managed by the design control unit 303. The image allocation table 3032 is an image data allocation table managed by the design control unit 303, which records an information table concerning the number of image data to be allocated to each page.

The merchandise composition data 3041 is information about optional merchandise compositions of which the user can place an order to the print site 103. The merchandise composition data 3041 holds for each optional merchandise composition, a book size such as A4, the number of composition pages, and the thickness information of album composition paper. These pieces of information are held for each optional merchandise composition of which the user can place an order to the print site 103. The communication control unit 304 communicates with the print site to update the merchandise composition data 3041 to an optimum state, as needed.

<Outline of Processing of Album Editor>

FIG. 4 is a flowchart for explaining the outline of the procedure of processing of the album editor 108 according to this embodiment. FIGS. 5A to 5G are views showing the user interface of the album editor 108 according to this embodiment. The operation of the album editor 108 will schematically be described in association with the operation on the user interface (UI).

Step S401 is the merchandise selection step. The album editor 108 acquires the merchandise composition data 3041 that is information about merchandise composition of which the user can place an order to the print site 103 using the communication control unit 304. The album editor 108 forms a merchandise selection UI 500 representing the optional merchandise items shown in FIG. 5A based on the merchandise composition data 3041, and displays the UI on the CRT 201 using the GUI control unit 302. For all UI operations on the merchandise selection UI 500, the GUI control unit 302 responds and performs processing unless it is specifically stated otherwise. In this embodiment, the merchandise selection UI 500 includes merchandise items 501 and 502 as optional merchandise items. The merchandise selection UI 500 shown in FIG. 5A is provided to the user, and a merchandise item is determined based on selection and instruction from the user. The user exclusively selects one of optional radio buttons 5011 and 5012 to determine the merchandise item to be generated by the album editor 108.

The merchandise item 501 is a free layout album for which the user can freely edit the number of pages to be included in the album and the positions of photos in the album. The number of pages to be included in the album can range from 12 to 400, including the cover and the back cover. The user can also select one of a softcover using relatively thin paper and a hardcover using thick paper as the cover of the merchandise item 501. The type of cover of the merchandise item to be generated by the album editor 108 is determined upon receiving user's exclusive selection of a radio button 50111 or 50112.

The merchandise item 502 is a merchandise material for which the number of pages to be included in the album is limited to 12, 20, and 24. This is a simple album for which the positions of photos in the album are determined by automatic layout. The user can exclusively select one of a softcover and a hardcover by radio buttons 50121 and 50122 as the cover of the merchandise item 502, like the merchandise item 501. The number of pages to be included in the album is determined based on user's exclusive selection of a radio button 50123, 50124, or 50125.

After selection on the above-described merchandise selection UI 500, the user presses a next button 503 to determine the merchandise item to be generated by the album editor 108. When the merchandise item is determined, the GUI control unit 302 notifies the data control unit 301 of the selected album material setting. The data control unit 301 stores the album material setting in the album composition data 3012 as the setting of the album to be generated. After the setting is stored, the album editor 108 advances the process to the next step. In this embodiment, a case will be described below in which the user selects the merchandise item 501 that is a free layout album with a high degree of freedom for the number of composition pages.

Step S402 is the image data selection step. The album editor 108 displays an image selection UI 510 shown in FIG. 5B on the CRT 201 using the GUI control unit 302 to select candidates of images to be arranged on the album. For all UI operations on the image selection UI 510, the GUI control unit 302 responds and performs processing unless it is specifically stated otherwise. The image selection UI 510 includes a folder selection region 511 to select the image acquisition destination. Folder icons of a desktop 5111 and a photo site 5112 are displayed in the folder selection region 511.

The desktop 5111 is an icon representing image acquisition from a desktop folder in the HDD 209 of the client apparatus 102. The desktop 5111 is selected by a click. If image files are stored in the selected folder, the thumbnails of the images are displayed in a folder image region 512. If a subordinate folder exists, the icon of the subordinate folder is displayed under the folder icon of the tree structure in the folder selection region 511. If an external medium is mounted in the external media drive 203, the folder icon of the external medium is displayed under the desktop folder of the tree structure in the folder selection region 511. If the image input apparatus 101 is connected to the local communication I/F 210, the folders in the apparatus are also displayed as the subordinate folder of the desktop folder of the tree structure in the folder selection region 511.

The photo site 5112 is an icon representing image acquisition from the image DB 110 of the photo site 105 via the network 106. As for the click operation, it exhibits the same UI behavior as the icon of the desktop 5111. The difference from the desktop folder is that an image to be displayed in the folder image region 512 is acquired by the communication control unit 304 from the photo site 105 via the network I/F 211 and displayed. Selecting a plurality of images in the folder image region 512 can be accepted by a click of the pointing device 205 or a shortcut key operation on the keyboard 204 by the user. Upon receiving user's image selection in the folder image region 512 or press of an addition button 513, the thumbnails of the selected images are copied to a selection window region 514. The copied images are the candidate images to be arranged in the album. At this time, each image candidate may undergone image processing such as compression/decompression so as to be suitable for display of the album or the editing window.

In the selection window region 514 as well, the album editor 108 can accept selection of a plurality of images by a click of the pointing device 205 or a shortcut key operation on the keyboard 204 by the user. Upon receiving user's image selection in the selection window region 514 or press of a deletion button 515, the album editor 108 can exclude the selected image from the selection window region 514. When a candidate image exists in the selection window region 514, a next button 516 is enabled. The album editor 108 stores the image data of the candidate images in the selection window region 514 in the candidate image 3011 using the data control unit 301 when the user presses the next button 516. Note that when the user presses a back button 517, the process returns to the merchandise selection step S401.

Step S403 is the edit & preview step. The album editor 108 displays an edit & preview UI 520 shown in FIG. 5C on the CRT 201 using the GUI control unit 302, which is a UI to be used to edit and preview the album. For all UI operations on the edit & preview UI 520, the GUI control unit 302 responds and performs processing unless it is specifically stated otherwise.

The edit & preview UI 520 is roughly divided into four regions. The first region is an operation button region 521 where various kinds of operations buttons necessary for album generation are arranged. The second region is a double truck page editing region 522 in which the preview of a double truck page of the album is displayed. The third region is a candidate image tray 523 where the thumbnails of the images selected in the image data selection step S402 are displayed. These thumbnails are generated by the image group of the candidate image 3011 managed by the data control unit 301.

The last, fourth region is a whole album preview 524 where the previews of all pages included in the album generation are displayed as double trucks. The previews displayed here are generated based on the information of the album composition data 3012, the cover content data 3013, and the internal page content data 3014 managed by the data control unit 301. Note that for a newly generated album, the previews of the minimum number of pages that can be generated in the merchandise-selected album format are displayed.

Figure 5C:
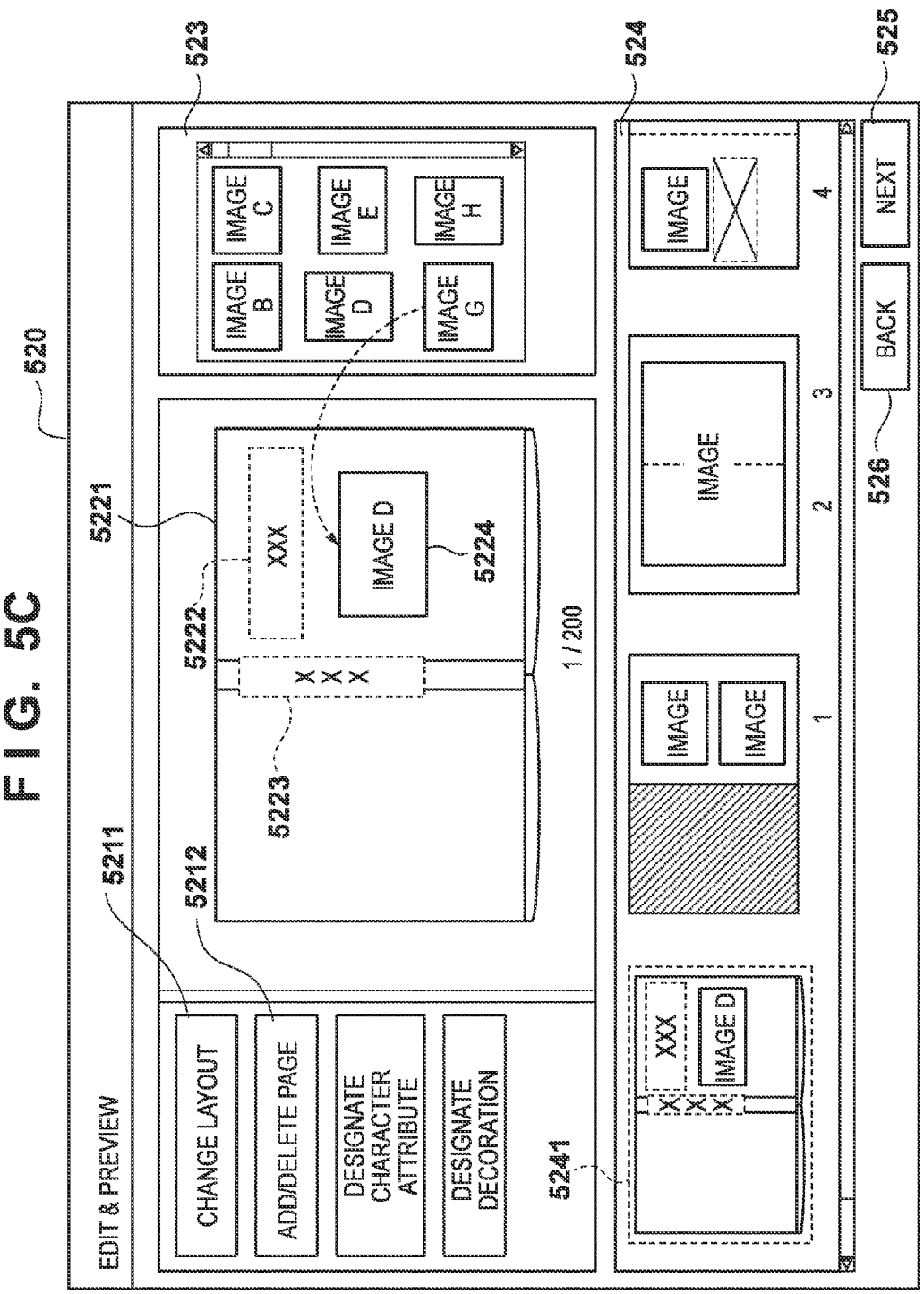
Figure 5D:
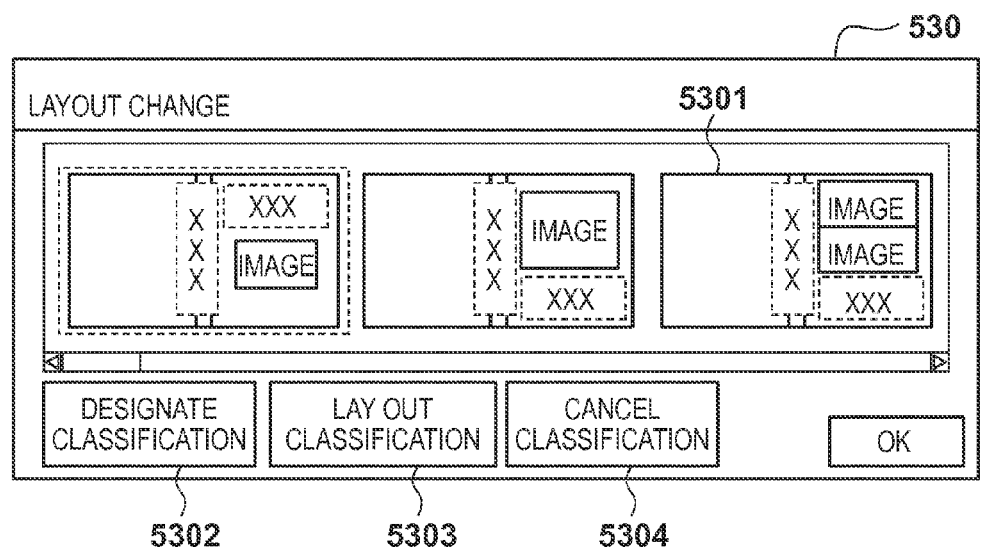
Figure 5E:
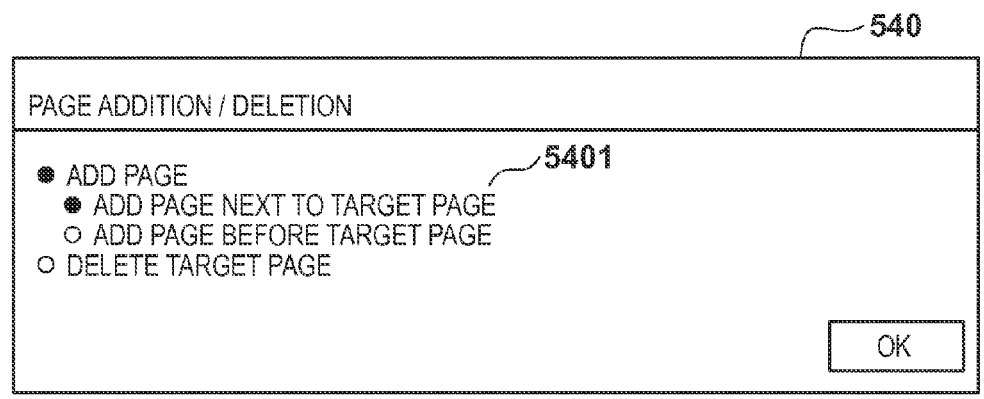

In the whole album preview 524, one of the previews of the double truck pages is always selected. The user can change the selection target to another double truck page by performing the selection operation for the previews using the keyboard 204 or the pointing device 205. The preview of the editing target in the double truck page editing region 522 also changes synchronously when the selected preview changes. FIG. 5C illustrates a state in which a preview 5241 of the cover and the back cover of the book is selected. A preview 5221 of the cover and the back cover is displayed in the double truck page editing region 522. FIG. 5C shows an example of an album that reads from left to right. For this reason, the right half of the preview 5221 of the cover and the back cover represents the preview of the cover, and the left half represents the preview of the back cover. The preview of the spine is displayed at the center between the cover and the back cover.

A title text region 5222 exists on the preview of the cover. A spine title text region 5223 exists on the preview of the spine. The text regions 5222 and 5223 are selected by user's click of the pointing device 205 to accept character input from the keyboard 204 by the user. FIG. 5C shows an example in which a character string "memory of journey" is input. The input character information is managed by the data control unit 301 as the cover content data 3013. Additionally, an image region 5224 of the cover is displayed on the preview of the cover.

When the user selects an image in the candidate image tray 523 by the pointing device 205 and drags and drops it to the image region 5224 of the cover, the selected image is allocated to the region. The allocated image is sent to the data control unit 301 and managed as the cover content data 3013. When pages other than the cover and the back cover are displayed in the double truck page editing region 522, the user can edit the text and image regions in the same way as described above using the keyboard 204 and the pointing device 205. In this case, the contents edited based on a user instruction are stored in the internal page content data 3014.

A layout change button 5211 and a page addition/deletion button 5212 are arranged in the operation button region 521. When the user presses the layout change button 5211, a dialogue 530 shown in FIG. 5D which allows to change the arrangement positions of the text and image regions is displayed for the editing target pages displayed in the double truck page editing region 522. Selectable layout compositions 5301 are displayed in the dialogue 530, which are calculated by the design control unit 303 based on the information of the layout information 3031 and the image allocation table 3032. Upon receiving user selection of the layout composition 5301, the design control unit 303 changes the arrangement positions of the texts and photos on the editing target pages displayed in the double truck page editing region 522.

The data control unit 301 stores the change result of the layout of the editing target pages in the cover content data 3013 or the internal page content data 3014. Upon this storage, the GUI control unit 302 changes the previews in the double truck page editing region 522 and the whole album preview 524.

In this embodiment, the pages included in the book can be partitioned on the page basis in accordance with the classification of the contents, and thumb indices representing the content classification can be assigned to the pages. A thumb index can be assigned to each of the obverse and reverse surfaces of each paper sheet in accordance with the content classification. When the user presses a classification designation button 5302 shown in FIG. 5D, a classification designation window 550 shown in FIG. 5F is displayed. The classification designation method is designated by exclusively selecting one of "classify by Exif information", "classify by folder name of image storage source", "classify by image file name", and "manually input classification", as indicated by radio buttons 5501 in FIG. 5F. When the user selects "classify by Exif information", a lower attribute more specific than "classify by shooting date and time" is designated by exclusively selecting one of "classify by shooting year" and "classify by shooting month". The content classification can also be done using Exif information other than the shooting time and date. However, a description of details will be omitted here.

When "classify by folder name of image storage source" is selected as the classification designation method, the folder names of the contents stored in the HDD 209 of the client apparatus 102 are handled as classifications. For example, contents under a folder name "Mt. Yarigatake" are classified into "Mt. Yarigatake". When "classify by image file name" is selected, the contents are classified by the prefix of content file names or the like. For example, if content file names are "Mt. Yarigatake_Ascent Starting Point", "Mt. Yarigatake_ Top", and "Mt. Yarigatake_Kamikouchi", these contents are classified into "Mt. Yarigatake". When manually inputting the classification, it is designated using a classification designation window 560 shown in FIG. 5G which is displayed when the user presses a classification edit button 5502.

The classification designation window 560 shown in FIG. 5G displays a list of images in the candidate image tray 523. The user designates the content classification by inputting text characters in a classification information input area 5601. After inputting the classification information in FIGS. 5F and 5G, the user presses a classification layout button 5303 in FIG. 5D so that the design control unit 303 edits the layout in accordance with the content classification information. Layout editing includes, for example, arranging contents of the same classification in a single page or inserting a line break between classifications to partition the page. The design control unit 303 assigns a thumb index to each page in the book in accordance with the content classification in each page. The classification to which each content belongs can be generated to classify the contents using additional information (for example, date and file name) of each content (image data) to be arranged in a page, as shown in FIGS. 5F and 5G.

FIG. 6 shows the edit & preview UI when the design control unit 303 has assigned thumb indices. A page 601 shows a list of classifications in the book. A page 602 shows an example of thumb index information assigned to each page. The thumb index information is, for example, "I" printed at the edge of the page 602 in FIG. 6. When the user presses a classification cancel button 5304 in FIG. 5D, thumb index assignment is canceled, and the layout returns to the automatic layout in the initial state.

When the current editing target page displayed in the double truck page editing region 522 is an internal page of the album, the page addition/deletion button 5212 is enabled. Upon receiving user's press of the page addition/deletion button 5212, a dialogue 540 shown in FIG. 5E, which allows to add/delete a page to/from the album, is displayed. The user can add a page to the preceding or succeeding side of the current editing target page or delete the editing target page by designating a radio box group 5401. The data control unit 301 stores the result of page addition/deletion processing in the internal page content data 3014. The total number of pages of the album is stored in the album composition data 3012. Upon this change, the GUI control unit 302 changes the previews in the double truck page editing region 522 and the whole album preview 524. Note that the range of the number of composition pages of the album as a merchandise item is predetermined, and the information is managed by the communication control unit 304 as part of the merchandise composition data 3041. Based on the range information of the number of composition pages, pages are added or deleted within the range of the number of composition pages of the album.

The operation button region 521 also includes a button to be used to change the attribute of characters in a text region and a button capable of changing decorations such as a frame and background in addition to the layout change button 5211 and the page addition/deletion button 5212 described above, and a description thereof will be omitted.

When the user presses a next button 525, the album editor 108 causes the data control unit 301 to execute verification and formatting processing of the album data 3012 to 3014 as a merchandise item generated in step S403. Details will be described later. If no problem has arisen in the verification and formatting processing, the album editor 108 advances the process to step S404. If a problem has arisen in the verification and formatting processing, the album editor 108 outputs a warning message to the user and urges to reedit the album in step S403.

Step S404 is the order step. First, the album editor 108 causes the communication control unit 304 to upload the album data 3012 to 3014 generated in step S403 to the print site 103. After the upload, the print site 103 returns an ID associated with the upload. The album editor 108 requests the Web browser 109 to display the order page of the print site associated with the ID. The user designates the album payment method and the sending destination using the order page on the Web browser 109. These processes are the same as those on an album order site on the WEB base, and a description thereof will be omitted. The arrangements of the user interface shown in FIGS. 5A to 5G are mere examples. The arrangement of the regions and buttons may be changed if the same functions can be implemented.

First Embodiment

The first embodiment will be described in detail based on the fundamental arrangement described above. The procedure of processing of the system of the book generation apparatus shown in FIG. 1 and, more particularly, the album editor 108 of the client apparatus 102 has been described above. In the first embodiment, processing of determining, based on a preset condition, whether to assign a thumb index to each page in a book will be described. Whether to assign a thumb index to each page in a book is determined by a design control unit 303 at a timing a classification layout button 5303 is pressed in the edit & preview step S403 of an album editor 108.

In this embodiment, whether to assign a thumb index to each page in a book is determined by four determination criteria based on the following characteristics of a book. Note that the thumb indices may be assigned when all conditions of the following four determination criteria are satisfied. Alternatively, priority may be given to each determination criterion, and the thumb indices may preferentially be assigned when a specific condition is satisfied. Detailed set values of the determination criteria to be described below are merely examples, and the present invention is not limited to those. Hence, the values may be changed as needed.

First determination criterion: the number of pages of the book

Second determination criterion: the number of pages of the book and the number of classifications Third determination criterion: the grammage of paper sheets of the book Fourth determination criterion: the presence/absence of a full print page The determination criteria will be explained below in detail.

FIG. 7A shows a thumb index assignment condition based on the first determination criterion. In this case, it is determined based on the number of pages of the book whether to assign thumb indices. That is, the determination criterion indicates whether the book includes a predetermined number of pages or more. In this embodiment, the thumb index assignment condition is that the number of pages of the book is "15 or more", as indicated by a thumb index assignment condition 701. The thumb index assignment condition 701 may be preset in the album editor 108 or referred from a print site 103 via a network 106.

Figure 8:
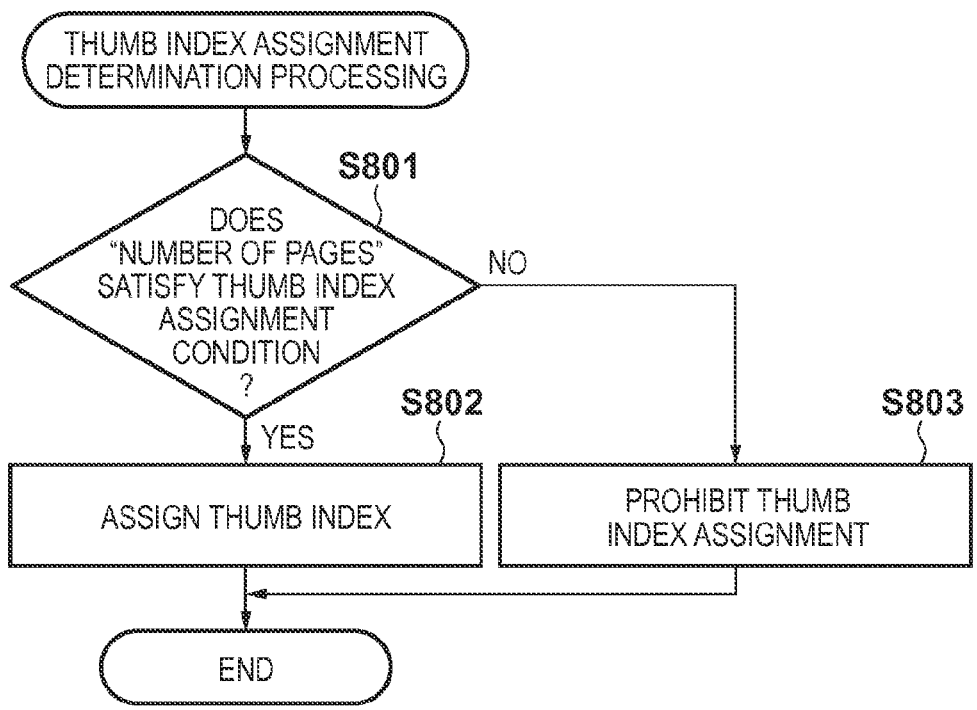
FIG. 8 is a flowchart of thumb index assignment determination processing.

FIG. 8 is a flowchart of thumb index assignment determination processing. This processing procedure is executed by causing a CPU 206 provided in a client apparatus 102 to read out a program from a ROM 207 or the like serving as a storage unit and execute it. First, in step S801, the album editor 108 determines whether the number of pages of the book satisfies the thumb index assignment condition 701. If the condition is satisfied, the album editor 108 assigns the thumb indices (S802). If the condition is not satisfied, the album editor 108 assigns no thumb indices (S803). This is based on the concept that when the number of pages in a book is small, the contents in the book are easily identifiable without assigning thumb indices. Using the assignment condition shown in FIG. 7A allows the album editor 108 to determine whether to assign a thumb index to each page in a book.

FIG. 7B shows thumb index assignment conditions based on the second determination criterion. In this case, it is determined based on the number of pages of the book and the number of classifications whether to assign thumb indices. That is, the determination criterion indicates whether a predetermined number of classifications are provided with respect to the number of pages of the book. In this embodiment, the thumb index assignment condition is defined as follows, as indicated by a thumb index assignment condition 901. When the number of pages of the book is "15 to 30", the number of classifications is "6 or less". When the number of pages is "31 to 60", the number of classifications is "15 or less". When the number of pages is "61 to 400", the number of classifications is "20 or less". The thumb index assignment conditions 901, 902, and 903 may be preset in the album editor 108 or referred from the print site 103 via the network 106.

Figure 9:
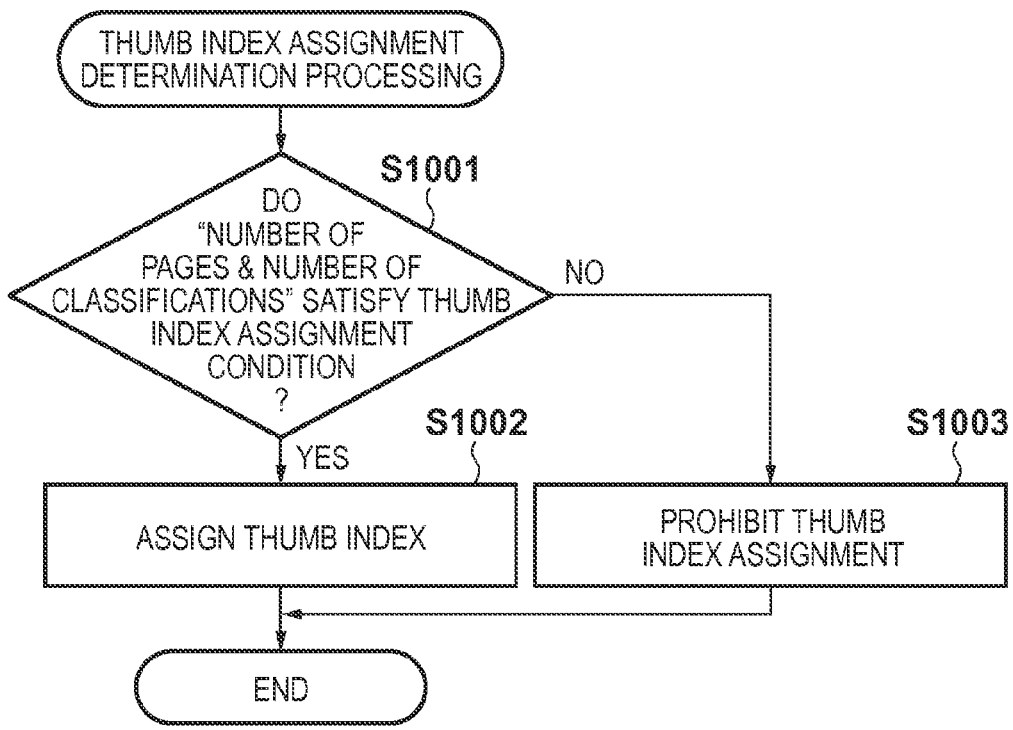
FIG. 9 is a flowchart of thumb index assignment determination processing.

FIG. 9 is a flowchart of thumb index assignment determination processing. This processing procedure is executed by causing the CPU 206 provided in the client apparatus 102 to read out a program from the ROM 207 or the like serving as a storage unit and execute it. First, in step S1001, the album editor 108 determines whether the number of pages of the book and the number of classifications satisfy one of the thumb index assignment conditions 901, 902, and 903. If a condition is satisfied (YES in step S1001), the album editor 108 assigns thumb indices (S1002). If no condition is satisfied (NO in step S1001), the album editor 108 assigns no thumb indices (S1003). If the number of pages is approximate to the number of classifications to a predetermined level or more in the book, for example, if the book has "30" pages and "28" classifications, the contents in the book cannot easily be identified even by assigning thumb indices. Assuming such a case, using the assignment conditions shown in FIG. 7B allows the album editor 108 to determine whether to assign a thumb index to each page in a book.

FIG. 7C shows a thumb index assignment condition based on the third determination criterion. In this case, it is determined based on the grammage of internal pages of the book whether to assign thumb indices. That is, the determination criterion indicates whether the grammage of pages included in the book has a predetermined value or less. In this embodiment, the thumb index assignment condition is that the grammage is "60 $g/m^2$ or less", as indicated by a thumb index assignment condition 1101. The thumb index assignment condition 1101 may be preset in the album editor 108 or referred from the print site 103 via the network 106. Note that the book may use a plurality of different kinds of paper sheets. In this case as well, it may be determined for each page whether to assign a thumb index. Note that although the third determination criterion uses the grammage of pages as the thumb index assignment condition, the thickness of pages (paper) included in the book or the paper type (for example, plain paper, recycled paper, wood free paper, or glossy paper) may be used as the thumb index assignment condition. For example, thumb indices may be assigned when the paper thickness has a predetermined value or less, and thumb index assignment may be prohibited when the paper thickness is larger than the predetermined value.

Figure 10:
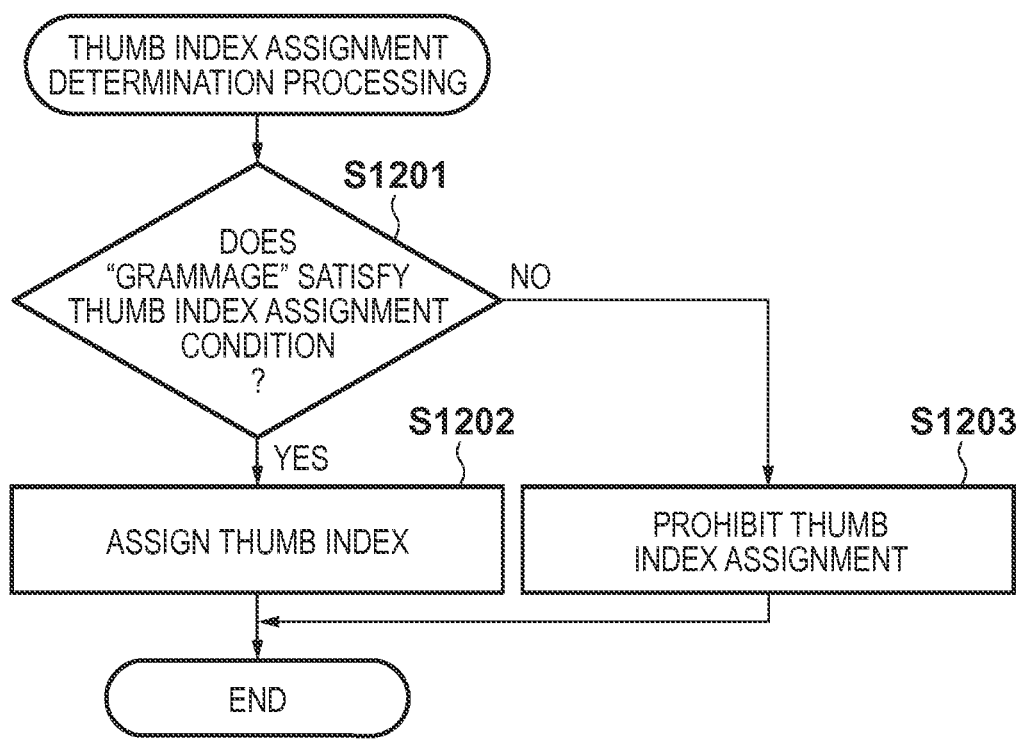
FIG. 10 is a flowchart of thumb index assignment determination processing.

FIG. 10 is a flowchart of thumb index assignment determination processing. This processing procedure is executed by causing the CPU 206 provided in the client apparatus 102 to read out a program from the ROM 207 or the like serving as a storage unit and execute it. First, in step S1201, the album editor 108 determines whether the grammage of the book satisfies the thumb index assignment condition 1101. If the condition is satisfied (YES in step S1201), the album editor 108 assigns thumb indices (S1202). If the condition is not satisfied (NO in step S1201), the album editor 108 assigns no thumb indices (S1203). This is based on the concept that if the grammage in a book is large, the classification information cannot be identified in a strip shape when, for example, the book is visually observed from the fore edge side, and the classification information cannot easily be identified even by assigning thumb indices. Using the assignment condition shown in FIG. 7C allows the album editor 108 to determine whether to assign a thumb index.

Figure 11:
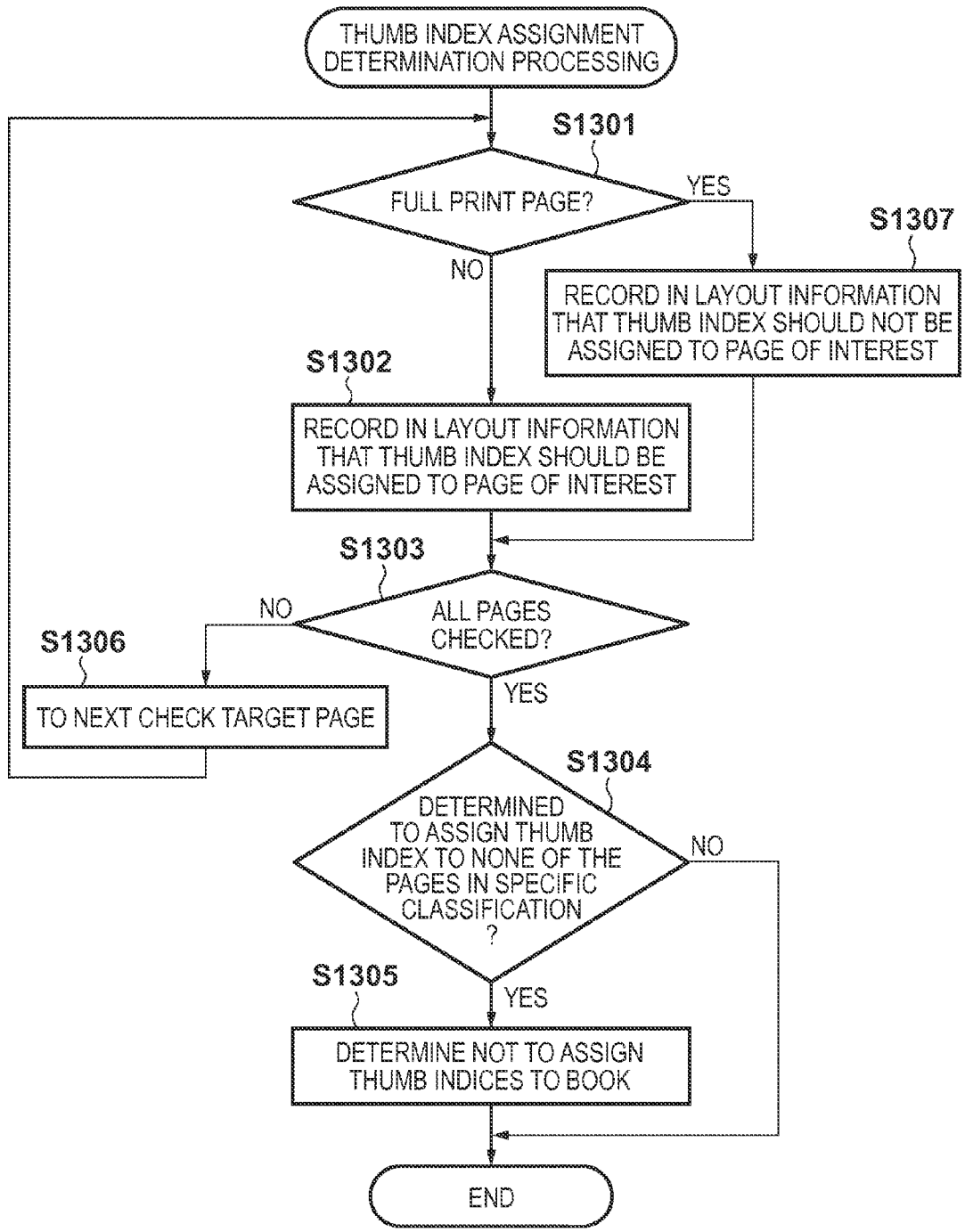
FIG. 11 is a flowchart of thumb index assignment determination processing.

Whether to assign thumb indices to pages or a book is determined by the thumb index assignment condition based on the fourth determination criterion, that is, whether a full print page exists. The full print page indicates a page in which the print target area is set on the entire surface of the paper sheet. For example, a full print page is formed by printing one image all over a paper sheet. FIG. 11 is a flowchart for explaining the fourth thumb index assignment determination. This processing procedure is executed by causing the CPU 206 provided in the client apparatus 102 to read out a program from the ROM 207 or the like serving as a storage unit and execute it.

In step S1301, the album editor 108 determines whether the first page is a full print page. Upon determining that the page is a full print page (YES in step S1301), the album editor 108 records in layout information 3031 that the thumb index should not be assigned to the page of interest (S1307). Upon determining in step S1301 that the page is not a full print page (NO in step S1301), the album editor 108 records in the layout information 3031 that the thumb index should be assigned to the page of interest (S1302).

Next, in step S1303, the album editor 108 determines whether the check has been done for all pages in the book. Upon determining that the determination has not been done for all pages (NO in step S1303), the next unchecked page is selected as the page of interest (S1306), and the process returns to step S1301. Upon determining in step S1303 that the determination has been done for all pages (YES in step S1303), the album editor 108 determines by referring to the layout information 3031 whether it is recorded for all pages in a specific classification that no thumb indices should be assigned (S1304). If it is recorded for all pages in a specific classification that no thumb indices should be assigned (YES in step S1304), the album editor 108 determines not to assign thumb indices to the whole book and records this information (S1305). The processing procedure thus ends.

The above-described processing makes it possible to prohibit thumb index assignment to a full print page. If a specific classification in a book has a setting to prohibit thumb index assignment, it does not make any sense because classification identification by thumb indices is absent. In this case, thumb index assignment can be prohibited for the entire book.

As described above, according to this embodiment, it is possible to improve the flexibility and convenience in visualizing classification in a book by determining thumb index assignment based on a predetermined determination criterion for the book.

Second Embodiment

Figure 12B:
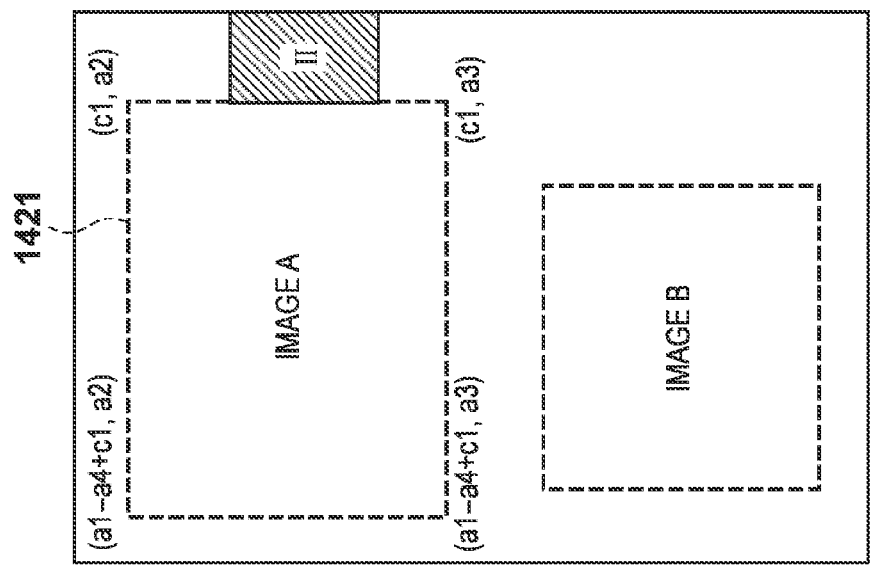
FIGS. 12A and 12B are views showing an example of layout change.
Figure 12A:
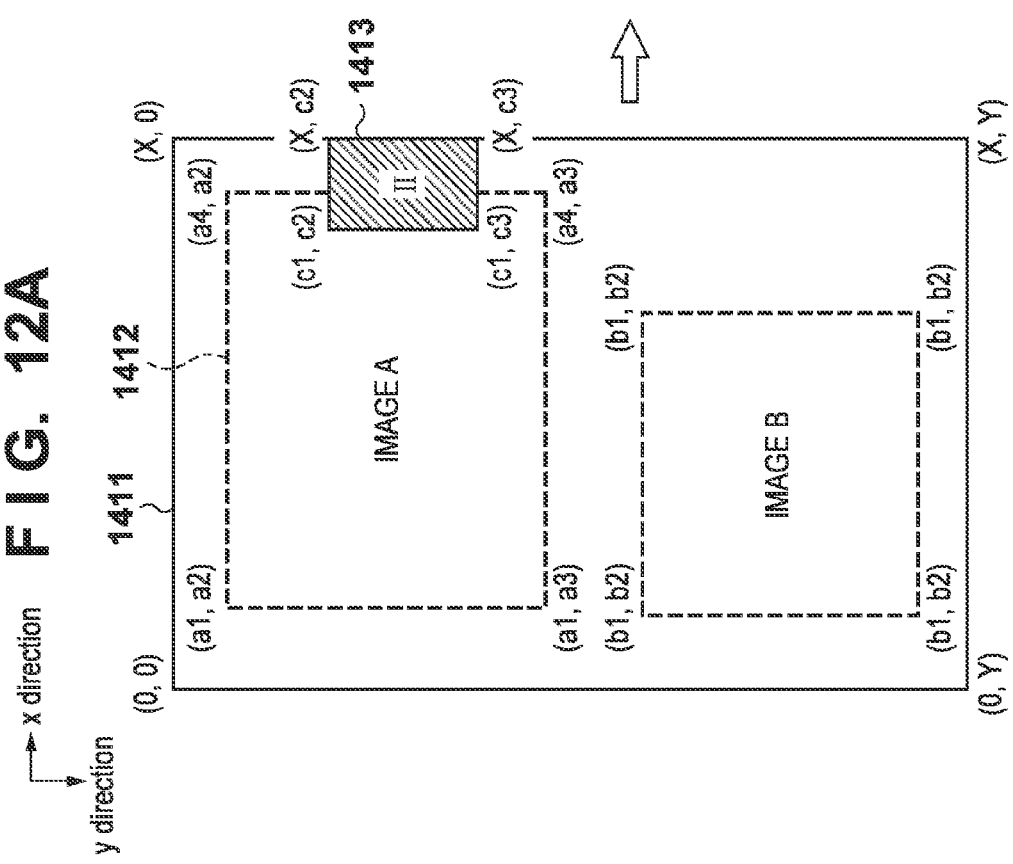

In the second embodiment, processing of adjusting the image layout and the thumb index positions in a book will be described in addition to the first embodiment. That is, in this embodiment, an image in a page is shifted not to overlap a thumb index, thereby preventing the image and the thumb index from overlapping in the page. FIG. 12A shows an example of an image layout before thumb index assignment. Referring to FIGS. 12A and 12B, the horizontal direction is defined as the x direction, and the vertical direction as the y direction. The coordinates of the vertices of a paper sheet 1411 are (0,0), (X,0), (0,Y), and (X,Y). The coordinates of the vertices of an image A 1412 are (a1,a2), (a4,a2), (a1,a3), and (a4,a3). Assume that the coordinates of the vertices of a thumb index 1413 to be assigned by a design control unit 303 are (c1,c2), (X,c2), (c1,c3), and (X,c3).

When the image A 1412 and the thumb index 1413 overlap, as shown in FIG. 12A, the overlap amount is given by "a4−c1" in the x direction. If a1>a4−c1 is satisfied, overlap of the image A 1412 and the thumb index 1413 can be prevented by shifting the coordinates of the image A 1412 in the x direction by "a4−c1". In this case, the coordinates of the vertices of the image A 1412 after the movement are (a1−a4+c1,a2), (c1,a2), (a1−a4+c1,a3), and (c1,a3). That is, the design control unit 303 is provided with a unit that "rearranges an image not to overlap the thumb index when the margin between the image and the paper edge on the side opposite to the thumb index is larger than the overlap amount between the image and the thumb index".

Figure 14:
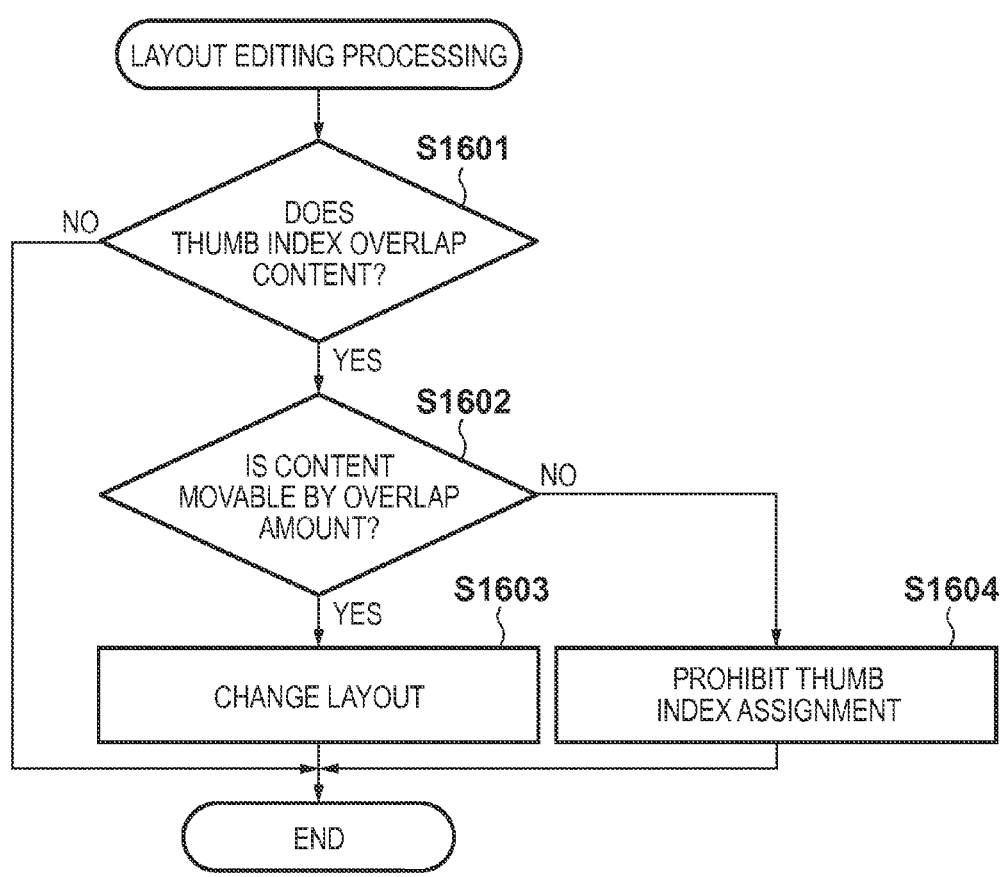
FIG. 14 is a flowchart of layout change processing according to the second embodiment.

FIG. 14 is a flowchart illustrating the procedure of the processing. This processing procedure is executed by causing a CPU 206 provided in a client apparatus 102 to read out a program from a ROM 207 or the like serving as a storage unit and execute it. In step S1601, an album editor 108 determines whether the thumb index overlaps an image in the page. Upon determining that the thumb index and the image overlap (YES in step S1601), the album editor 108 determines based on the above-described method whether the image can be rearranged by moving it by the overlap amount (S1602). The album editor 108 changes the layout of the image (S1603) upon determining that the image can be moved (YES in step S1602). Upon determining in step S1602 that the image cannot be rearranged moved (NO in step S1602), the album editor 108 records in layout information 3031 that the thumb index should not be assigned (S1604). The processing procedure thus ends.

The above-described processing makes it possible to adjust the layout of contents not to make an image overlap a thumb index, in addition to the effect of the first embodiment.

Third Embodiment

Figure 13B:
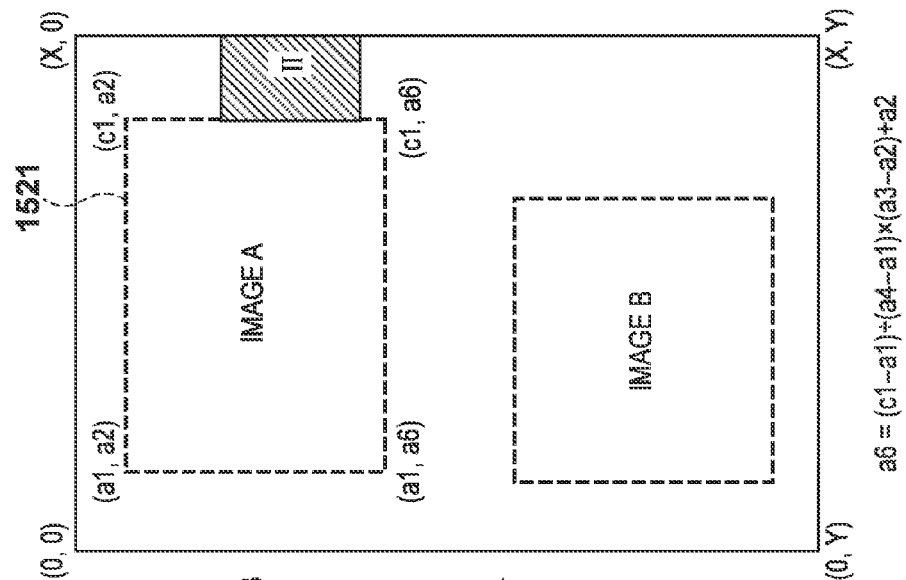
FIGS. 13A and 13B are views showing an example of layout change.
Figure 13A:
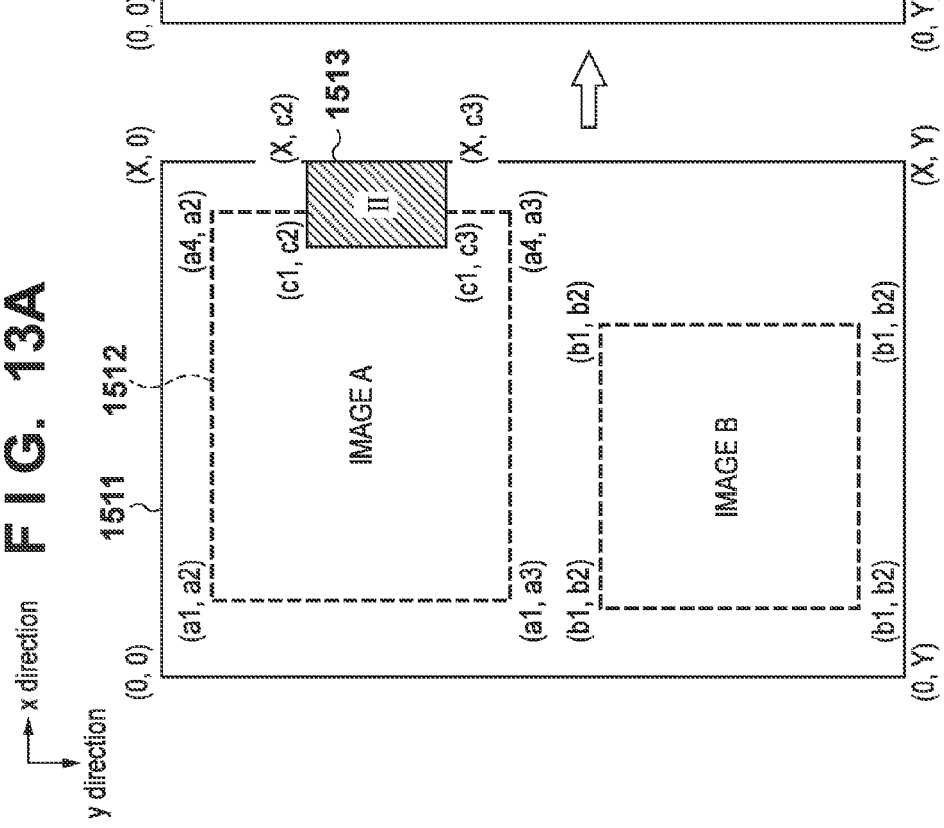

In the third embodiment, processing of adjusting the image layout and the thumb index positions in a book will be described in addition to the first embodiment. That is, in this embodiment, an image in a page is reduced not to overlap a thumb index, thereby preventing the image and the thumb index from overlapping in the page. FIG. 13A shows an example of an image layout before thumb index assignment. Referring to FIGS. 13A and 13B, the horizontal direction is defined as the x direction, and the vertical direction as the y direction. The coordinates of the vertices of a paper sheet 1511 are (0,0), (X,0), (0,Y), and (X,Y). The coordinates of the vertices of an image A 1512 are (a1,a2), (a4,a2), (a1,a3), and (a4,a3). Assume that the coordinates of the vertices of a thumb index 1513 to be assigned by a design control unit 303 are (c1,c2), (X,c2), (c1,c3), and (X,c3).

When the image A 1512 and the thumb index 1513 overlap, as shown in FIG. 13A, overlap of the image and the thumb index can be prevented by reducing the image A 1512 using (a1,a2) as the starting point. In the example shown in FIG. 13A, the maximum reduction ratio is given by $$(\text{maximum reduction ratio}) = (c1-a1) \div (a4-a1) \qquad (1)$$

That is, the design control unit 303 is provided with a unit that "reduces an image when it overlaps a thumb index".

FIG. 15 is a flowchart illustrating the procedure of the processing. This processing procedure is executed by causing a CPU 206 provided in a client apparatus 102 to read out a program from a ROM 207 or the like serving as a storage unit and execute it. In step S1701, an album editor 108 determines whether the thumb index overlaps an image in the page. Upon determining that the thumb index and the image overlap (YES in step S1701), the album editor 108 reduces the content and lays it out based on the above-described method (S1702).

Upon determining that the thumb index and the image do not overlap (NO in step S1701), the album editor 108 stores in layout information 3031 that the thumb index should be assigned (S1703). The processing procedure thus ends.

The above-described processing makes it possible to adjust the layout of contents not to make an image overlap a thumb index, in addition to the effect of the first embodiment.

Fourth Embodiment

In the fourth embodiment, processing considering the relationship between the background color and the thumb index color in a page will be described in addition to the first embodiment. In this embodiment, whether to assign a thumb index is determined based on the background color at the thumb index arrangement position (the color of the fore edge of the page at the thumb index arrangement position). That is, the thumb index color is compared with the background color at the thumb index arrangement position, which is the color of the paper sheet or an image to be arranged. If the colors are identical or similar, the thumb index color is changed, or thumb index assignment is prohibited.

In this embodiment, the thumb index color is set by the user in advance. The information of the color of book paper to be used for printing is also held in advance. Note that the "color similarity" indicates that the difference between the background color and the thumb index color falls within a range defined in advance. In addition, the strip of thumb indices may become unnoticeable depending on the color combination. Hence, the combinations may be defined in advance, and thumb index assignment may be controlled to exclude the combinations.

FIG. 16 is a flowchart illustrating the procedure of the processing. This processing procedure is executed by causing a CPU 206 provided in a client apparatus 102 to read out a program from a ROM 207 or the like serving as a storage unit and execute it. In step S1801, an album editor 108 determines whether the background color around the thumb index arrangement position has a color value identical or similar to that set as the thumb index color. Upon determining that the color values are identical or similar (YES in step S1801), the album editor 108 determines in step S1802 whether the thumb index color is changeable. At this time, the album editor 108 may inquire the user about it or determine in accordance with a setting held in advance. Upon determining that the thumb index color is changeable (YES in step S1802), the album editor 108 changes the thumb index color, and records in layout information 3031 that the thumb index should be assigned. The album editor 108 records in layout information 3031 that the thumb index should not be assigned upon determining that the thumb index color is unchangeable (NO in step S1802). Upon determining in step S1801 that the color values are neither identical nor similar (NO in step S1801), the album editor 108 records in the layout information 3031 that the thumb index should be assigned (S1805). The processing procedure thus ends.

The above-described processing makes it possible to prevent a thumb index from becoming unnoticeable and leading to difficulty in classification identification because the thumb index color is identical or similar to the background color at the thumb index arrangement position, in addition to the effect of the first embodiment.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-273938 filed Dec. 8, 2010 and No. 2011-237968 filed Oct. 28, 2011, which are hereby incorporated by reference herein in their entirety.

What is claimed is:

1. A data generation apparatus for generating data to be used for bookbinding by bundling a plurality of paper sheets into a book form, comprising:
a determination unit configured to determine based on a criterion defined in advance for a characteristic of the book whether to assign a thumb index for each page of the book; and
a generation unit configured to generate, for a page to which said determination unit has determined to assign the thumb index, data that arranges the thumb index to be printed at a fore edge of the page of the book,
wherein said determination unit determines to assign the thumb index when, as the characteristic of the book, the number of pieces of classification information to which image data included in the book belong falls within a predetermined range defined based on the number of pages of the book.

2. The apparatus according to claim 1, wherein said determination unit determines, as the characteristic of the book, whether the book includes not less than a predetermined number of pages, and determines to assign the thumb index when the book includes not less than the predetermined number of pages.

3. The apparatus according to claim 1, wherein said determination unit determines not to assign the thumb index to, out of the pages included in the books, a page where printing is performed all over the page as the characteristic of the book.

4. The apparatus according to claim 1, wherein when said determination unit determines not to assign classification information to all pages belonging to a specific one of pieces of classification information to which image data to be arranged on the pages included in the book belong, a thumb index is assigned to none of the pages included in the book.

5. The apparatus according to claim 1, wherein said determination unit compares a background color at a position where the thumb index is to be arranged with a color of the thumb index, and determines to change the color of the thumb index and assign the thumb index when the background color is identical or similar to the color of the thumb index.

6. The apparatus according to claim 1, further comprising:
a classification unit configured, using additional information of image data, to generate classification information to which the image data belong and classifies the image data; and
a partition unit configured to partition the pages on which the image data are to be arranged in the book at a break between the classifications using the classification information of the image data.

7. A data generation apparatus for generating data to be used for bookbinding by bundling a plurality of paper sheets into a book form, comprising:
  a determination unit configured to determine based on a criterion defined in advance for a characteristic of the book whether to assign a thumb index for each page of the book; and
  a generation unit configured to generate, for a page to which said determination unit has determined to assign the thumb index, data that arranges the thumb index to be printed at a fore edge of the page of the book,
  wherein said determination unit determines to assign the thumb index when, as the characteristic of the book, a grammage of the pages included in the book has not more than a predetermined value.

8. A data generation apparatus for generating data to be used for bookbinding by bundling a plurality of paper sheets into a book form, comprising:
  a determination unit configured to determine based on a criterion defined in advance for a characteristic of the book whether to assign a thumb index for each page of the book; and
  a generation unit configured to generate, for a page to which said determination unit has determined to assign the thumb index, data that arranges the thumb index to be printed at a fore edge of the page of the book,
  wherein said determination unit compares a color of the fore edge of the each page with a color of the thumb index, and determines not to assign the thumb index when the color of the fore edge is identical or similar to the color of the thumb index.

9. A data generation method of generating data to be used for bookbinding by bundling a plurality of paper sheets into a book form, comprising:
  determining based on a criterion defined in advance for a characteristic of the book whether to assign a thumb index for each page of the book; and
  generating, for a page to which it is determined in the determining step to assign the thumb index, data that arranges the thumb index to be printed at a fore edge of the page of the book;
  wherein it is determined in the determining step to assign the thumb index when, as the characteristic of the book, the number of pieces of classification information to which image data included in the book belong falls within a predetermined range defined based on the number of pages of the book.

10. A non-transitory computer-readable medium storing a program for generating data to be used for bookbinding by bundling a plurality of paper sheets into a book form, that causes a computer to function as:
  a determination unit configured to determine based on a criterion defined in advance for a characteristic of the book whether to assign a thumb index for each page of the book; and
  a generation unit configured to generate, for a page to which said determination unit has determined to assign the thumb index, data that arranges the thumb index to be printed at a fore edge of the page of the book,
  wherein said determination unit determines to assign the thumb index when, as the characteristic of the book, the number of pieces of classification information to which image data included in the book belong falls within a predetermined range defined based on the number of pages of the book.

11. A data generation method of generating data to be used for bookbinding by bundling a plurality of paper sheets into a book form, comprising:
  determining based on a criterion defined in advance for a characteristic of the book whether to assign a thumb index for each page of the book; and
  generating, for a page to which it is determined in the determining step assign the thumb index, data that arranges the thumb index to be printed at a fore edge of the page of the book,
  wherein it is determined in the determining step to assign the thumb index when, as the characteristic of the book, a grammage of the pages included in the book has not more than a predetermined value.

12. A data generation method of generating data to be used for bookbinding by bundling a plurality of paper sheets into a book form, comprising:
  determining based on a criterion defined in advance for a characteristic of the book whether to assign a thumb index for each page of the book; and
  generating, for a page to which it is determined in the determining step assign the thumb index, data that arranges the thumb index to be printed at a fore edge of the page of the book,
  wherein in the determining step, a color of the fore edge of the each page is compared with a color of the thumb index, and it is determined not to assign the thumb index when the color of the fore edge is identical or similar to the color of the thumb index.

* * * * *